United States Patent
Takai et al.

[11] Patent Number: 6,024,287
[45] Date of Patent: Feb. 15, 2000

[54] CARD RECORDING MEDIUM, CERTIFYING METHOD AND APPARATUS FOR THE RECORDING MEDIUM, FORMING SYSTEM FOR RECORDING MEDIUM, ENCIPHERING SYSTEM, DECODER THEREFOR, AND RECORDING MEDIUM

[75] Inventors: Kazuhito Takai; Shiro Fujihara, both of Tokyo, Japan

[73] Assignee: NEC Corporation, Tokyo, Japan

[21] Appl. No.: 08/975,057

[22] Filed: Nov. 20, 1997

[30] Foreign Application Priority Data

Nov. 28, 1996 [JP] Japan .................................. 8-317545
Dec. 27, 1996 [JP] Japan .................................. 8-357504
Feb. 3, 1997 [JP] Japan .................................. 9-020602

[51] Int. Cl.$^7$ .................................................. G06K 19/06
[52] U.S. Cl. ........................ 235/493; 235/494; 340/825.34
[58] Field of Search .................................. 235/493, 487, 235/494, 462.25, 375, 376; 340/825.34; 382/124, 118

[56] References Cited

FOREIGN PATENT DOCUMENTS

| 64-76270 | 3/1989 | Japan . |
| 3-185585 | 8/1991 | Japan . |
| 3-193495 | 8/1991 | Japan . |
| 6-135187 | 5/1994 | Japan . |

OTHER PUBLICATIONS

"Nikkei Electronics" No. 660 pp. 13 (Apr. 22, 1996).
"Nikkei Electronics" No. 683 pp. 99–124 (Feb. 24, 1997).

*Primary Examiner*—F. L. Evans
*Attorney, Agent, or Firm*—Foley & Lardner

[57] ABSTRACT

In a card type recording medium containing a data area where data containing ID information of a holder are recorded, and an image area where image data are recorded, in the image area are recorded second image data which are generated by transforming first image data specifying the holder to frequency-area data, adding the transformed frequency-area data with the ID information and inversely transforming the added data to image signals.

50 Claims, 19 Drawing Sheets

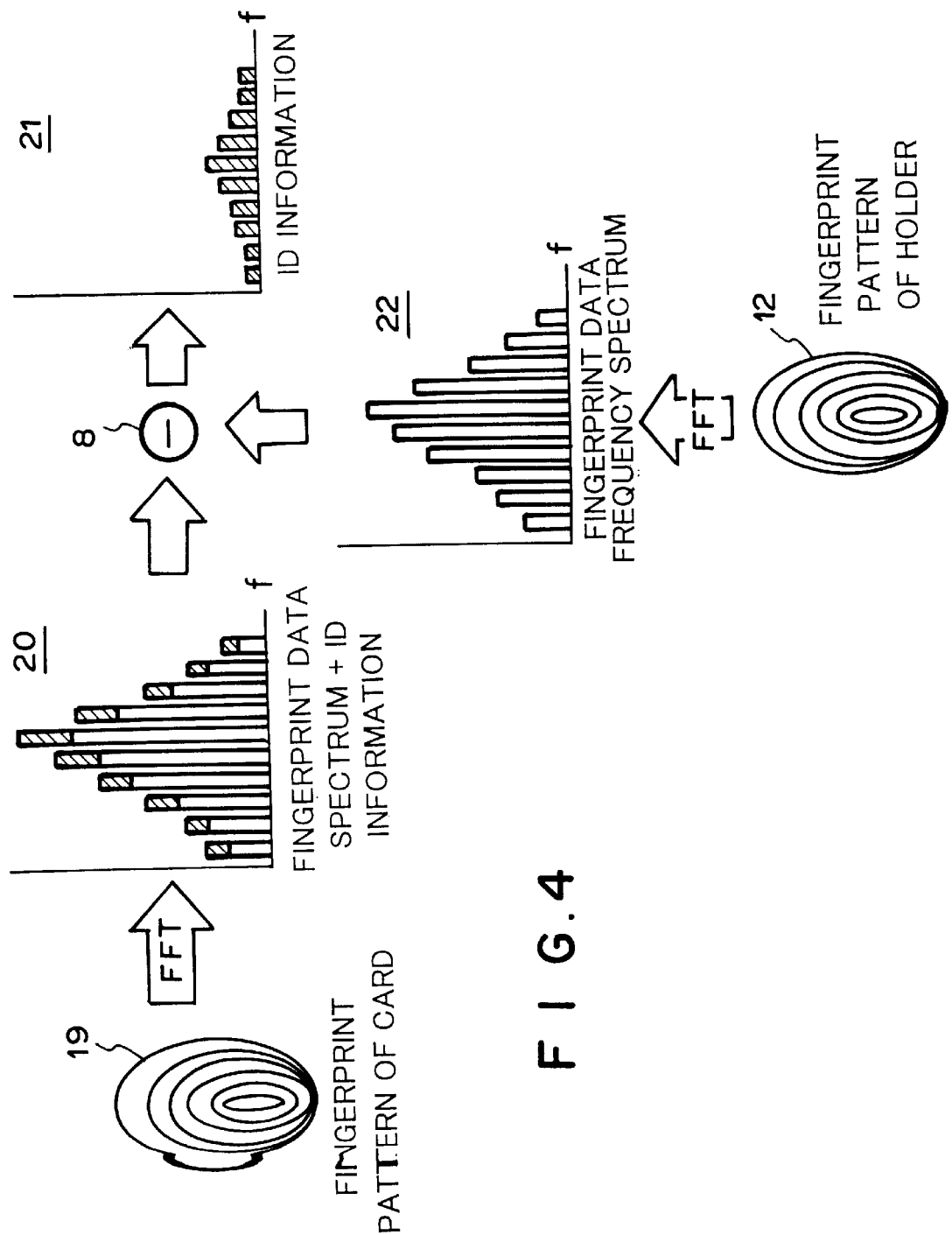
F I G. 4

FIG. 5
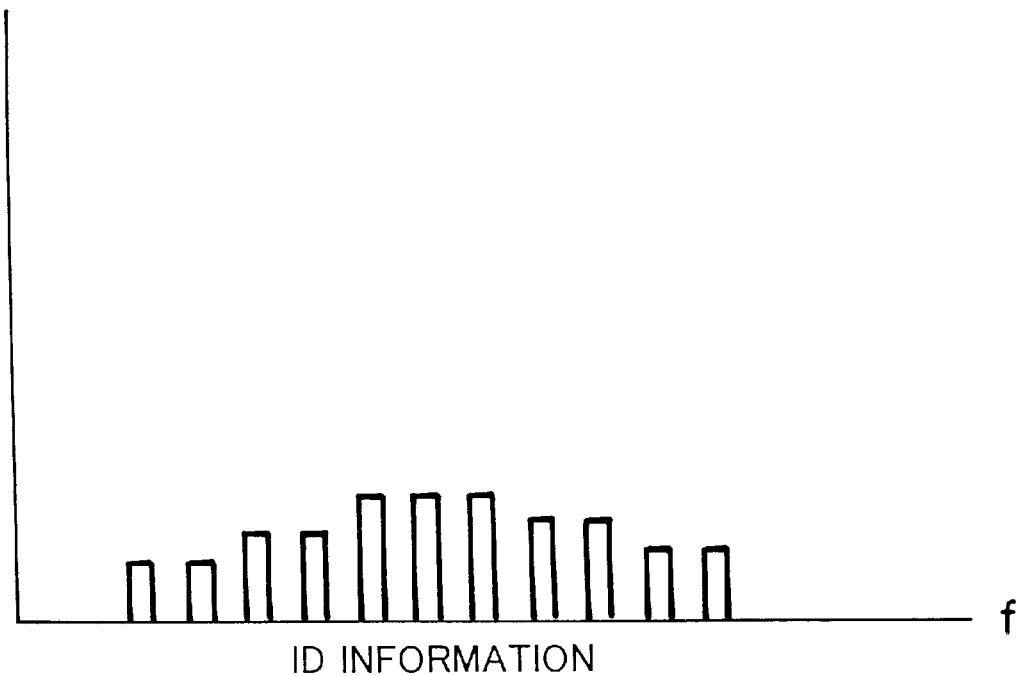
ID INFORMATION
⇓ REARRANGE OF DISTRIBUTION OF FREQUENCY DOMAIN
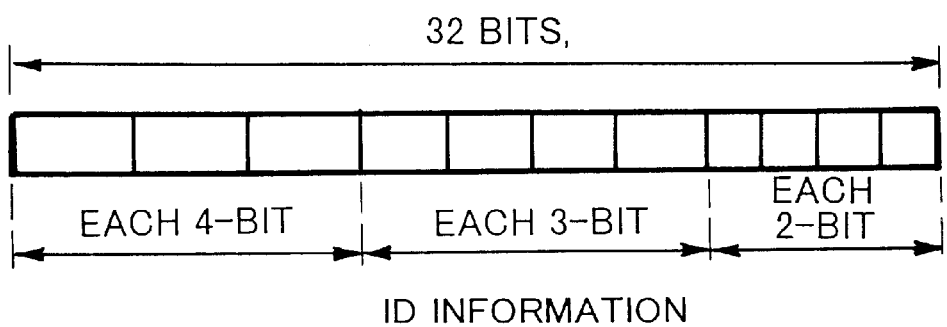
ID INFORMATION

FIG. 9
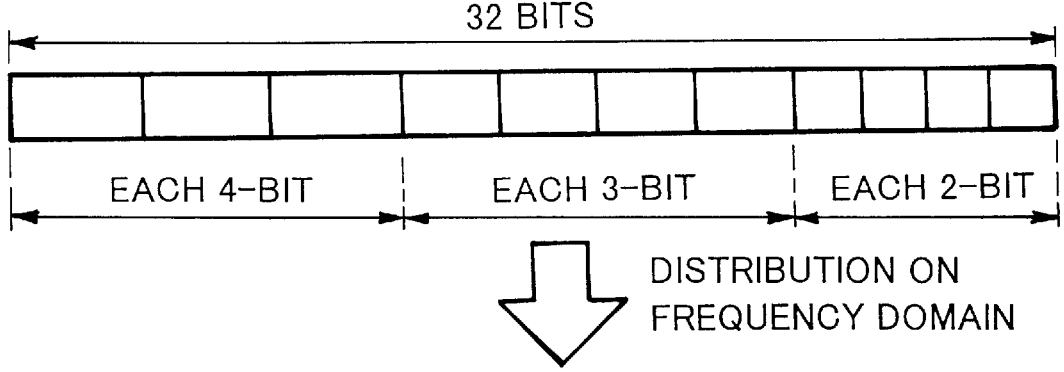
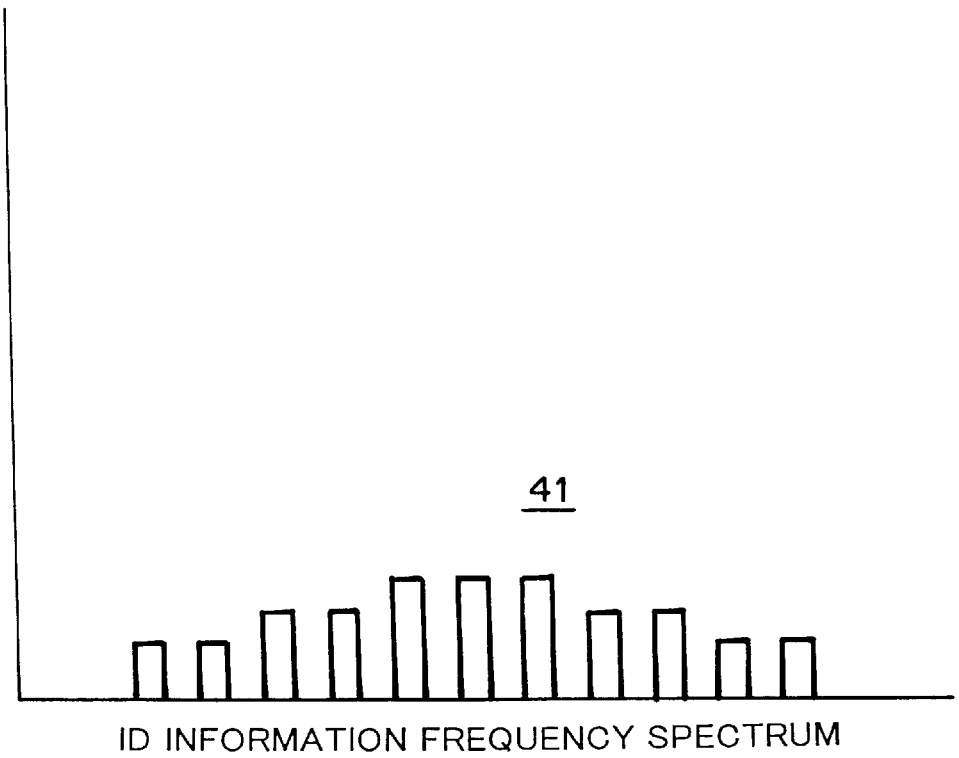
ID INFORMATION FREQUENCY SPECTRUM

F I G. 10
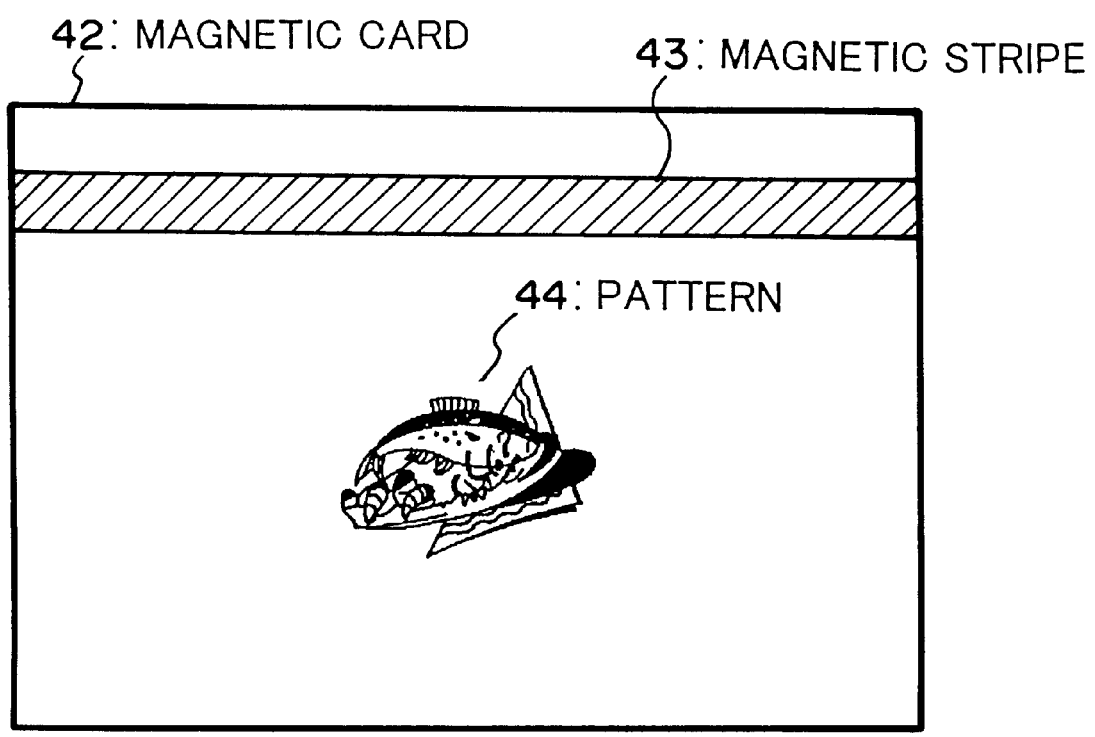

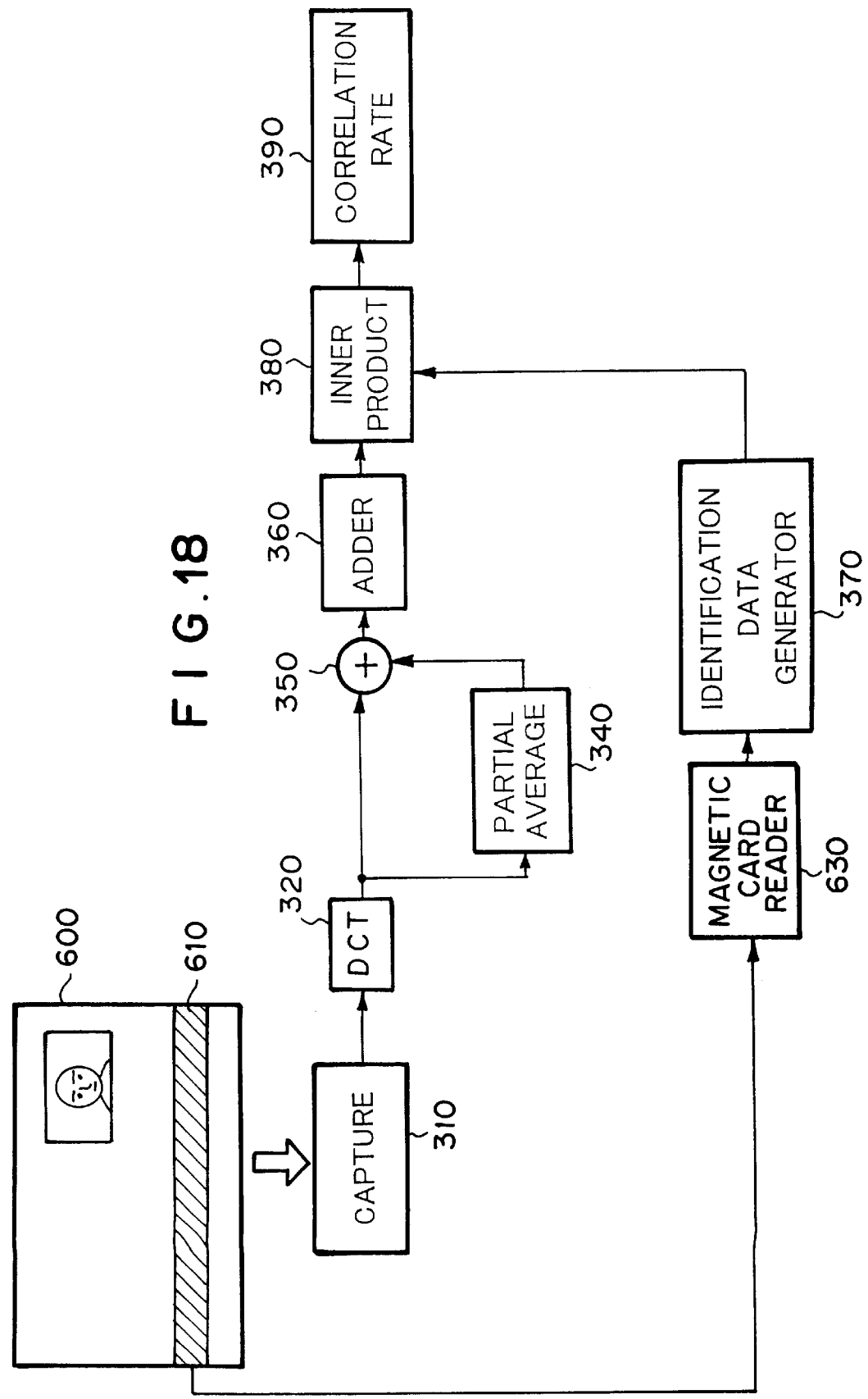

CARD RECORDING MEDIUM, CERTIFYING METHOD AND APPARATUS FOR THE RECORDING MEDIUM, FORMING SYSTEM FOR RECORDING MEDIUM, ENCIPHERING SYSTEM, DECODER THEREFOR, AND RECORDING MEDIUM

BACKGROUND OF THE INVENTION

1. Field of the Invention

The present invention relates to a card recording medium containing a magnetic card such as a credit card, a cash card, an identification (ID) card or the like, and particularly to a certifying method for certifying whether owner's card recording medium is true or not, a card recording medium enciphering system for enciphering ID (Identification) information recorded on a magnetic card, a card recording medium in which personal data (which are transformed to character data) and a photograph of the face of a user are recorded, and a recording medium in which a forming method and an enciphering method for the card recording medium are recorded as computer programs.

2. Description of Prior Art

Japanese Laid-open Patent Application No. Sho-64-76270 discloses one of techniques for verifying a true owner of a magnetic card such as a credit card, a cash card or the like, and one of enciphering systems for enciphering magnetic card ID information. According to the technique and the enciphering system as disclosed in the above publication, in order to enhance security when a holder of a magnetic card such as a credit card, a cash card or the like is confirmed, value information such as an amount of money to be drawn out, ID information which is desired to be recorded as magnetic information on the magnetic card, etc. are enciphered and recorded in the magnetic card in advance. In order to actually confirm whether the holder of the magnetic card is a true owner or not, the ID information recorded in the magnetic card is decoded from the magnetic card, and compared with ID information which is separately and directly input by the holder to verify whether the holder of the magnetic card is the true owner or not. (This publication is hereinafter referred to as "first prior art").

FIG. 20 is a block diagram showing a conventional magnetic card ID information enciphering system.

The operation of the conventional magnetic card ID information enciphering system will be described with reference to FIG. 20.

Enciphering means 72 enciphers ID information 71 (encipherment may be performed in any one of various ways) so that the ID information data cannot be easily analyzed by merely reading out the magnetic information of the ID information 71 from the magnetic card. Magnetic information forming means 73 records the magnetic information (enciphered ID information) generated by the enciphering means 72 at a magnetic recording portion (magnetic stripe or the like) on the magnetic card.

Further, Japanese Laid-open Patent Application No. Hei-06-135187 discloses a magnetic card on which a face photograph of an owner is printed on the card in addition to the magnetic data which are originally recorded in the magnetic card, and also data of enciphered photographic information are printed. In the technique as disclosed in this publication, the card contains an image region where the outlook information of the owner is displayed, and a scramble region where enciphered information obtained by transforming the image information on the basis of a predetermined logic is displayed. The enciphered photographic information is decoded by using an inverse logic to verify the identification between the decoded photographic information and the image information of the photograph of the face, thereby mechanically verifying the justice of the card. (This publication is hereinafter referred to as "second prior art").

Further, identification cards with photographs such as passports, identification cards of employees of companies, various kinds of licenses, etc. have recently propagated. Further, a credit card to which a photograph is attached has also propagated. These cards are generally called as "ID cards". Particularly, an ID card with a photograph which is issued by an official organization is used for identification. However, such an ID card may be forged. In fact, with respect to even present compact passports which are designed to be hardly imitated, there have appeared forged passports each of which is obtained by merely replacing a photograph with another in the compact passport. In addition, the forged passports are designed very elaborately and thus it is very difficult to look through the fake.

Two reasons are considered as the reason why forged ID cards containing the forged passports are formed. (1) A photograph attached onto the ID card can be replaced by another. (2) There is no relation between the photograph and the item described on the ID card. In other words, even if only the photograph is replaced by another and the other mentioned items are not changed, it is not identifiable at a glance whether the ID card is true or forged.

In order to overcome this drawback, there are needed (a) a method of forming an identification card so that a forging action itself to the ID card is difficult, and (b) a method of preventing use of a forged identification card by checking the forgery of the identification card even when the card is forged.

Here, Japanese Laid-open Patent Application No. Hei-3-193495 disclosed an example of the method (a) (hereinafter referred to as "third prior art"). This publication discloses an ID card issuing system using an image processing device taking face photograph information, attribute information, layout information, etc. In this ID card issuing system, not only the above information, but also forgery preventing information are subjected to image processing to form an image pattern, then a complicated pattern is superposed on a photograph, and then the overlapped photograph is printed on the ID card. In this method, the pattern to be superposed on the photograph is complicated to prevent the forgery.

Further, an example of the method (b) is disclosed in a fifth embodiment of Japanese Laid-open Patent Application No. Hei3-185585 (hereinafter referred to as "fourth prior art"). In this case, identification data for judging whether an identification card is true or forged are prepared on the basis of data described on the identification card, and the identification data are superposed on the photographic portion of the identification card and printed. According to this method, the mentioned items of the identification card and the identification data superposed on the photograph can be collated with each other. Therefore, even when the photograph is replaced by another, the forgery can be found out.

Further, Japanese Laid-open patent Application No. Hei-3-185585 discloses a method of embedding the identification data into the photograph. The identification data are determined by a calculation based on the mentioned items, and the data thus determined are embedded into a part of the photograph.

From another point of view, if a photograph printed on an ID card is judged to be normal, it can be judged whether the ID card is true or forged. Therefore, there has been proposed a method of frequency-transforming an image and embedding digital watermark data into frequency spectrum ("Nikkei Electronics" Apr. 22, 1996 (No. 660) p13, "Nikkei Electronics" Feb. 24, 1997 (No. 683) pp99–124) (hereinafter referred to as "fifth prior art").

In this method, an original work is frequency-transformed by DCT or Fast Fourier Transform, and the frequency spectrum is added with ID information of a random number inherent to each user to thereby spectrum spreading. Since the frequency spectrum containing the ID information is subjected to inverse frequency transformation and then the frequency spectrum having the ID information hidden therein and the frequency spectrum of the original work are differentiated, whereby the ID information is generated. Therefore, comparing the ID information with the normal ID information, it can be judged whether this ID conformation is an original work which is legally gained.

The electronic watermark is embedded into the frequency component while this ID information is set as the frequency spectrum of the low frequency component, and thus the electrical water mark is not lost even by the image processing such as the compression processing, the filtering processing, etc. Further, the random numbers which are conformed with the normal distribution are used as the electronic watermark to prevent the interference between the electronic watermark data, thereby making it difficult to break down the electronic watermark without having a great effect on image quality.

The embedding method of the electronic watermark data is as follows. First, an original image is transformed to frequency components by using discrete cosine transformation (DCT) or the like, and data of n which indicate high values in the frequency area are selected as $f(1), f(2), \ldots, f(n)$.

Subsequently, the electronic watermark data $w(1), w(2), \ldots, w(n)$ are selected from the normal distribution of 0 in average value and 1 in dispersion value, and the following equation is calculated for each frequency component:

$$F(i)=f(i)+\alpha|f(i)|*w(i)$$

Here, $\alpha$ represents a scaling element. Finally, the frequency component in which $f(i)$ is replaced by $F(i)$ is subjected to inverse discrete cosine transformation to obtain an image into which the electronic watermark data are embedded.

The detection of the electronic watermark data is performed by the following method. In this detection method, the original image and electronic watermark data candidates $w(i)$ ($i=1, 2, \ldots, n$) must be known.

First, an image with electronic watermark data is transformed to frequency components by using DCT or the like. Subsequently, the electronic watermark data $w(i)$ is calculated and extracted from $f(i)$ and $F(i)$ by the following equation:

$$W(i)=(F(i)-f(i))/f(i).$$

Subsequently, the statistical similarity of $w(i)$ and $W(i)$ is calculated by using the inner product of vectors:

$$C=W*w/(WD*wD)$$

Here, W ($W(1), W(2), \ldots, W(n)$), and w=($w(1), w(2), \ldots, w(n)$), (WD=the absolute value of vector W, and wD=the absolute value of vector w).

When the statistical similarity C is above a specific value, the electronic watermark data concerned are judged to be embedded.

The electronic watermark is generated from the mentioned items of the ID card, and embedded into a photograph to be printed. The electronic watermark is picked up from the photograph at the detection time, and compared with the mentioned items to judge whether the ID card is true or forged.

In the first prior art, the same magnetic card (a magnetic card which is regarded as being identical) can be prepared by merely reading magnetic information on a magnetic card and writing the magnetic information in a magnetic recording portion on another magnetic card like the magnetic recording portion on the magnetic card concerned. Therefore, if a third party directly copies the magnetic information, the same card can be easily prepared. Further, in the conventional magnetic card ID information enciphering system shown in FIG. 20, the ID information on the magnetic card is merely recorded as magnetic information, and thus a third party can easily copy the magnetic card concerned.

Further, in the second prior art in which a photograph is attached on a card, if it is directly copied, the same card can be prepared. Further, since data which is correlated with a face photograph is printed, the content of the card can be easily analyzed on the basis of the photograph data of the card. In the second prior art, if a photograph portion or a enciphered photograph information portion of the card is greatly scratched, the true card may be judged as a forged card. That is, in the such a conventional system that data obtained by enciphering photograph information are printed on a magnetic card, if the print data are directly copied, the same magnetic card can be prepared. Since data correlated with a face photograph are printed as "photograph information enciphered data", the content of the ID information (data obtained by enciphering photograph information) can be easily analyzed on the basis of the face photograph on the magnetic card.

Further, in the third prior art, since information for preventing forgery can be seen by a person who wants to forge the card, the person imitates a complicated pattern superposed thereon to forge the card to the level that an ordinary person cannot identify whether it is forged or not. It is possible to forge a forgery-preventing pattern in consideration of the present levels of the photograph technique, the image processing technique and the print technique. As a result, the forged ID cards cannot be identified unless there exists any clear difference in the mentioned items of the ID cards, for example, there is some difference in digit from the normal employee number, or the employee number is mentioned with Kanji although it must be originally mentioned with numerals.

In the fourth prior art, identification data which are generated from mentioned items of an ID card are printed while superposed on a photograph. According to this method, it can be judged whether the card is true or forged. However, in this case, the mentioned items and the identification data are visible data, and thus if a sufficient amount of data are collected, the calculation equation for generating the identification data from the mentioned items can be guided on the basis of both the data by the inverse operation. If this calculation equation is found out, any ID card using the same calculation equation as the ID card concerned can be forged unlimitedly. The method of embedding the identification data into the photograph is described. However, in this embodiment, the position at which the identification data are embedded is fixed, so that a forging person can easily specify the position.

In the fifth prior art using the electronic watermark, an original photograph is required, and there is no possibility that the original photograph is held together with an ID card. Accordingly, by only this technique, it is difficult to judge whether the holder of the ID card is a legal holder.

SUMMARY OF THE INVENTION

An object of the present invention is to provide a magnetic card ID information enciphering system in which ID information to be recorded/printed on a magnetic card is made both in the form of magnetic information and in the form of embedding into a pattern of a magnetic card to prevent a third party from easily copying the magnetic card, thereby enhancing security on the magnetic card.

Another object of the present invention is to make it very difficult to forge an ID card by using the electronic watermark technique, and to make it easy to judge whether a holder is a legal holder even when the ID card is forged.

In order to attain the above objects, according to a ciphering/deciphering system for a magnetic card in the present invention, there is provided means for easily judging whether an IC card is illegally forged (copied) or not by providing means for inputting information in a pattern of the card in addition to magnetic data so that the card is easily judged to be copied when a third party illegally copies the magnetic data of the card.

More specifically, a fingerprint pattern of an owner on the basis of which a pattern of an ID card is created is subjected to FFT (Fast Fourier Transform) to transform the fingerprint pattern to frequency-domain information, the ID information is added to a frequency component having strong energy on the basis of the frequency-domain information thus generated, the addition result is subjected to inverse FFT (Fast Fourier Transform) processing to transform the frequency-domain information to a two-dimensional image, and then the fingerprint pattern in which the ID information is embedded is printed on the card.

In an identification process of the ID card thus generated, the fingerprint pattern of the card is read by a reader to transform the read image to the frequency-domain information by the FFT processing. Thereafter, the fingerprint of the holder is read by the reader to transform the read data to frequency-domain information by the FFT processing. Both the results of the frequency-domain information are differentiated to extract ID information.

Further, data which are read by a magnetic card reader are decoded and deciphered to extract ID information as is usually performed. The ID information thus extracted and the ID information extracted from the card pattern are compared with each other. If the ID information is identical, the ID card is judged as an original card. On the other hand, if the ID information is different, the ID card is judged as a illegally copied card.

In addition to ordinary magnetic information, ID information is inserted into the pattern of the card on the magnetic card. Therefore, even when the magnetic data are copied, the card is not identified as the original card unless the pattern portion is copied. By comparing the ID information extracted from the pattern of the card and the ID information extracted from the magnetic data, an illegal copy of the card can be easily found out. Further, the insertion of the ID information into the pattern means that the ID information is printed in an area containing frequency components having strong energy on the pattern, so that a nonprofessional cannot find it. Even if the difference in pattern is found out, it is impossible to extract the ID information unless there is the fingerprint patter of a legal holder.

Further, a magnetic card ID information enciphering system according to the present invention which includes enciphering means for enciphering ID information of a magnetic card and magnetic information creating means for recording the enciphered ID information as magnetic information in the magnetic card, is characterized by further including frequency-domain transformation means for transforming an original image pattern of a magnetic card to frequency (spatial frequency) domain information, adding means for generating information in which the ID information of the magnetic card is distributed on the frequency domain, and adding the information thus generated and the information which is generated by the conversion of the frequency-domain transformation means, frequency-domain inverse transformation means for restoring the information of the frequency domain generated by the addition of the adding means to a two-dimensional image pattern, and image pattern print means for printing the image pattern generated by the frequency-domain inverse transformation means on the magnetic card so that the image pattern is used as a pattern of the magnetic card. Here, the frequency-domain transform means is implemented by FFT (Fast Fourier Transform) means, DCT (Discrete Cosine Transform) means or the like, and the frequency-domain inverse transformation means is implemented by inverse FFT means, inverse DCT means or the like.

Still further, according to a card recording medium of the present invention, a photograph to be printed on a card is taken as digital data, and the digital data thus taken are subjected to DCT transformation to be transformed to spatial frequency, and the identification data generated from the items mentioned on the card are inserted into the data after the transformation. When the card is used as an ID card, the data inserted in the ID card are subjected to IDCT(Inverse DCT) transformation to be restored to a normal photograph, and it is printed on the ID card together with the data described on the ID card. When checking the ID card, the photograph and the mentioned items of the ID card are read in, and the data of the read-in photograph are subjected to DCT to be transformed to spatial frequency. Further, identification (ID) data are generated from the read-in description matte, and it is judged on the basis of the correlation between the spatial frequency and the ID data whether the ID card is true or forged.

With the above construction, when the correlation between the photograph of the ID card and the identification data is high, the ID card is judged to be true. Further, when the correlation is low, the ID card concerned is judged to be forged.

Further, the present invention is directed to a recording medium in which a program for operating a card recording medium forming system in a computer is recorded. The program includes a step of generating identification data on the basis of specific data for specifying an owner, a step of transforming a photograph image to be attached to spatial frequency data, a step of multiplying each component of the spatial frequency data with the component corresponding to the identification data, adding the value obtained by multiplying the above multiplication value and a constant to the component corresponding to the spatial frequency data of the photograph image, and inversely transforming the added spatial frequency data to image data, and a step for writing the image data and the specific data on the card recording medium. Data to be respectively written in an image area where image data are written every step and a data area where ID information and specific data are written are created, so that the manufacturing of the recording media can be facilitated and uniform cards having no error can be manufactured.

BRIEF DESCRIPTION OF THE DRAWINGS

FIG. 4 is a diagram showing the principle of the present invention;

FIG. 5 is a diagram showing extraction of an ID information of the embodiment of the present invention;

FIG. 9 is a diagram showing the processing (ID information dividing processing, etc.) by adding means of FIG. 7;

FIG. 10 is a diagram showing an example of a magnetic card which is manufactured by a magnetic card ID information enciphering system shown in FIG. 7;

FIG. 18 is a flowchart showing the ID card checking processing of the seventh embodiment of the present invention;

DETAILED DESCRIPTION OF THE PREFERRED EMBODIMENTS

Preferred embodiments according to the present invention will be described hereunder with reference to the accompanying drawings.

[First Embodiment]

A first embodiment according to the present invention will be described.

Figure 1:
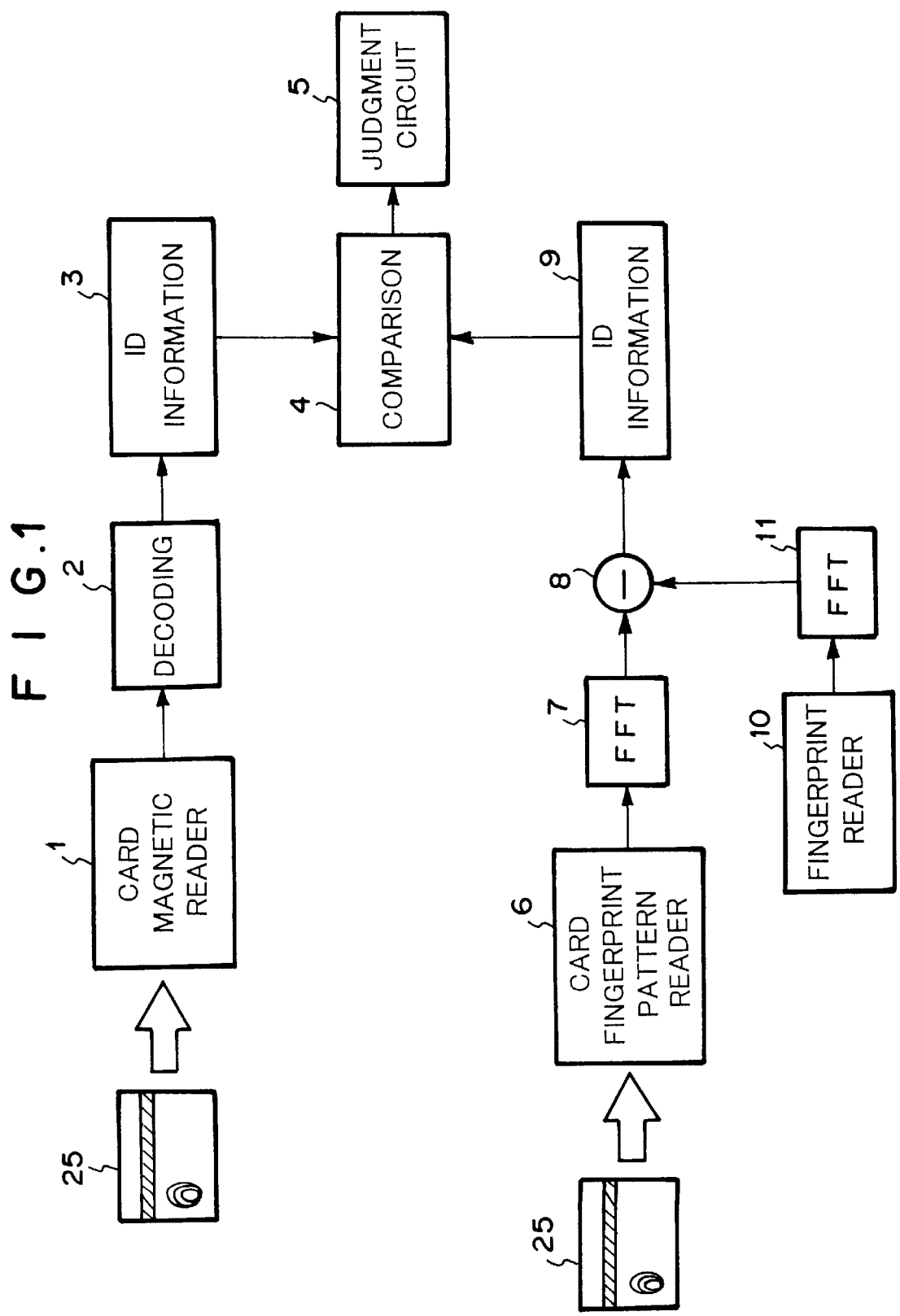
FIG. 1 is a block diagram showing judgment means for a card recording medium of the present invention.

As shown in FIG. 1, a fingerprint pattern printed on a card 25 is read out by a card image reader 6, and the image thus read is subjected to Fast Fourier Transform by FFT 7. Further, a fingerprint pattern of a current holder of the card 25 is read by a fingerprint pattern reader 10 and the data thus read are subjected to Fast Fourier Transform by FFT 11. A subtracter subtracts the output of the FFT 11 from the output of the FFT 7 to extract ID information 9 which specifies the owner of the card.

Further, magnetic data on the card 25 are also read and decoded by decoding processing 2 to extract ID information 3.

The ID information 9 extracted from the pattern of the card 25 and the ID information 3 extracted from the magnetic data are compared with each other by a comparator 4, and a judgment circuit 5 judges it on the basis of the comparison result whether the card 25 is illegally copied or not.

Next, the method of forming the card 25 will be described.

Figure 2:
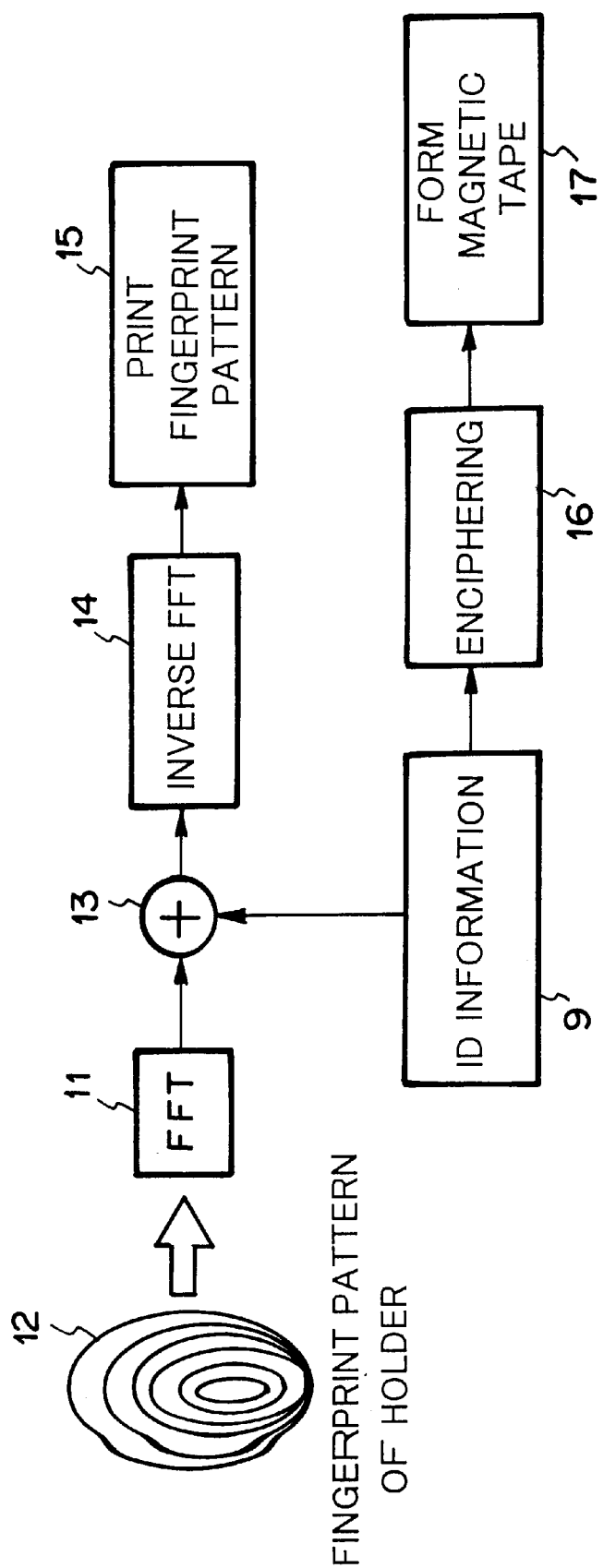
FIG. 2 is a flow of creating a card according to an embodiment of the present invention.
Figure 3:
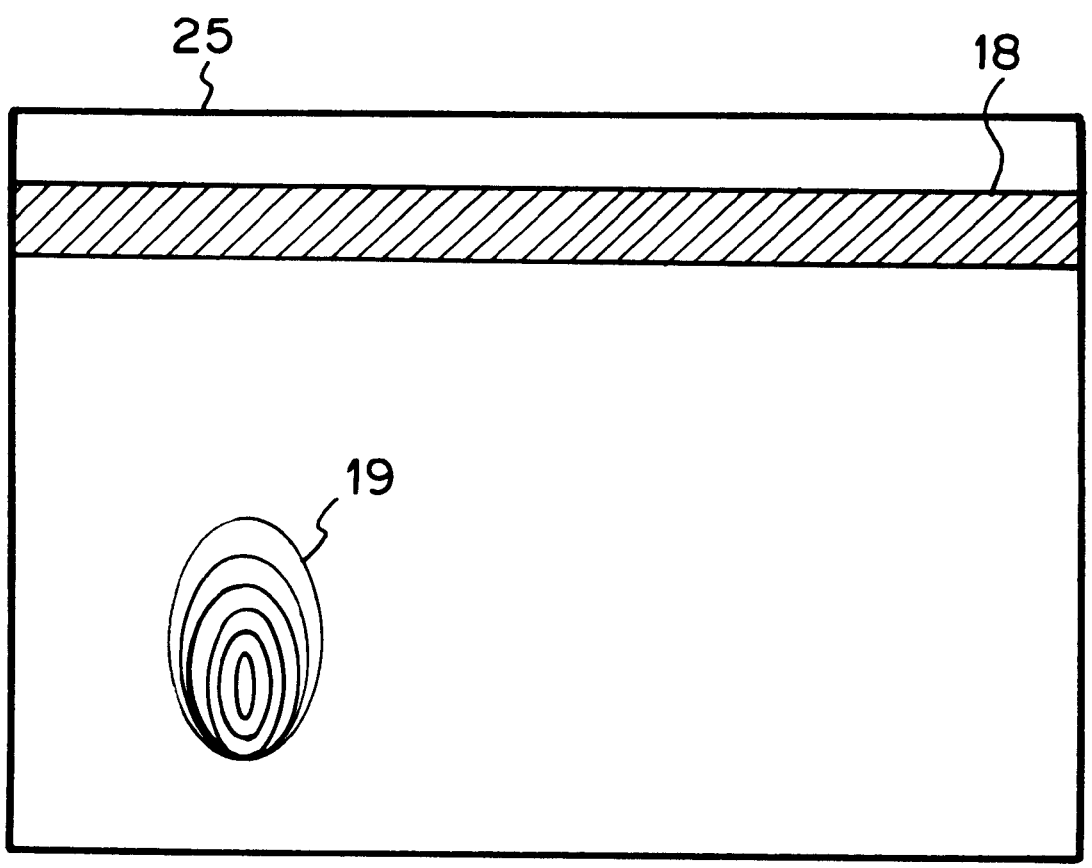
FIG. 3 is a diagram showing the card of the embodiment of the present invention.

As shown in FIG. 3, a fingerprint pattern 19 and a magnetic stripe 18 are formed on the card 25. Further, ID information is beforehand embedded in the fingerprint pattern of the card 25. The method of embedding the ID information will be described in detail with reference to FIG. 2.

In FIG. 2, the fingerprint pattern of the holder to be printed on the card 25 is read as a fingerprint image signal by an image reader (not shown), and subjected to Fast Fourier Transform in FFT 11 so that the fingerprint image signal is transformed to frequency domain. Thereafter, the ID information 9 is added to a frequency band containing frequency components having strong (high) energy by an adder 13. In this case, the ID information which is minute (weak in energy) is added to the band having the strong-energy frequency components, and thus it has little effect on the original image pattern.

Subsequently, the addition result is transformed to a two-dimensional image by inverse FFT 14 to form a pattern to be printed on the card 25, and a fingerprint pattern as indicated by reference numeral 19 in FIG. 3 is printed on the card 25 by a fingerprint pattern printer 15. Here, the printed fingerprint pattern 19 cannot be visually discriminated from the fingerprint pattern 12 of the holder itself, and this pattern looks like the original pattern even when the ID information is different.

Further, the ID information 9 is enciphered by an encipherer, and magnetic information is generated on the magnetic stripe (18 of FIG. 3) of the card by a magnetic tape forming machine 17. At this time, any one of the writing step of the fingerprint pattern 19 and the writing step of the magnetic information on the magnetic stripe may be performed prior to the other step, however, these steps must be matched integrally.

According to the above method, there can be formed a card in which the ID information of the card is printed in both the magnetic data and the pattern of the fingerprint pattern.

Returning to FIG. 1, the card 25 which is formed according to the above method is read by the fingerprint pattern reader 6, and the read image is subjected to Fast Fourier Transform by the FFT 7 to be transformed to frequency-domain information. Here, Fast Fourier Transform is a Fourier Transform of a discrete numeral sequence, and it has such an effect that the number of calculations can be more greatly reduced as compared with the general Fourier Transform. By performing the Fast Fourier Transform; the frequency spectrum of (fingerprint pattern+ID information) is generated, and this spectrum is shown (like fingerprint data spectrum+ID information 20) in FIG. 4. Subsequently, the fingerprint pattern 12 of the holder which is read by the fingerprint reader 10 is likewise transformed to frequency domain in the FFT 11 to obtain a fingerprint data frequency spectrum 22 as indicated by reference numeral 22 of FIG. 4. When the fingerprint data frequency spectrum 22 is subtracted from the frequency spectrum 20 of (fingerprint pattern+ID information) in the subtracter 8, only the ID information is extracted as shown in the frequency spectrum 21 of the ID information.

Further, the magnetic data on the card 25 are read out by the card magnetic reader 1 and the coded data of the information are decoded by the decoding processing 2 to extract the ID information 3. In the card magnetic reader 1, the finger pattern in the card 25 and the magnetic information of the magnetic strip in the card 25 are read out simultaneously or with a time lag by photoelectric transducing means of an optical head and a magnetic/electrical transducing means of a magnetic head respectively while the card and each of the heads are relatively moved.

Subsequently, the ID information extracted from the pattern of the fingerprint pattern of the card 25 and the ID information 3 extracted from the magnetic data of the card are compared by a comparator 4. If they are the same ID information, the judgment circuit 5 judges that the card is a normal (legal) card. If they are different from each other, the judgment circuit 5 judges that the card is illegally copied.

The above processing may be implemented by a computer having programs stored therein, or the like. That is, the program for executing the above processing is stored on a recording medium such as a floppy disc or the like, and the computer loads the program from the storing medium to execute the program.

Further, in the above embodiment, the fingerprint pattern and the ID information are written in the card type recording medium. A face photograph or information having some characteristic such as the retina of eyes and the ID information may treated as a pair to judge whether the holder of the card type recording medium is judged to be a right holder. Accordingly, the forgery of the card type recording medium can be prevented, and this embodiment is effective as a countermeasure against imitations.

In the above embodiment, the ID information is recorded on the magnetic stripe. However, the IC card may be used in place of the magnetic card, and for example the ID information may be stored into EEPROM, a flash memory or the like to apply the above operation as described above. Further, the same is applied to another card type recording medium. It is needless to say that the above point is applied at a suitable time in the following embodiments.

[Second Embodiment]

Next, a second embodiment will be described with reference to the accompanying drawings.

This embodiment will be described in detail and specifically according to the first embodiment.

Referring to FIG. 1, the fingerprint pattern 19 of the card 25 is read in by the card image reader 6. FFT 7 and FFT 11 are Fast Fourier Transform for dividing to frequency bands of 25 points. The quantization number per frequency band is set to 16 bits. In the subtracter 8, the fingerprint pattern of the holder which is read by the fingerprint reader 10 and then subjected to Fast Fourier Transform in FFT 11 is subtracted from the fingerprint pattern 19 which is read from the card in FFT 7 and then subjected to Fast Fourier Transform, thereby extracting the ID information 9 of 32 bits for specifying the user.

Further, the magnetic data 18 of the card 25 are read by the card magnetic reader 1, and the data thus read are decoded by the decoding 2 to extract the ID information 3 of 32 bits.

The ID information 9 of 32 bits which is extracted from the pattern of the fingerprint pattern 19 of the card 25, and the ID information 3 of 32 bits which is extracted from the magnetic data 18 are compared with each other by the comparator 4. If the ID information 9 and the ID information 3 are identical to each other, the comparator 4 outputs "0". If they are different from each other, the comparator 4 output "1". When "0" is output, the judgment circuit 5 judges that the ID card is a normal (legal) card. When "1" is output, it judges that the ID card is an illegally copied card.

First, ID information of 32 bits is beforehand embedded in the pattern of the fingerprint pattern 19 of the card 25. The method of embedding the ID information will be described in detail with reference to FIG. 2.

The fingerprint pattern 12 of the holder to be printed on the card is transformed to frequency domain by FFT 11, and the ID information 9 of 32 bits is added to a band having strong frequencies by the adder 12. FFT 11 is the Fast Fourier Transform for dividing into frequency bands of 25 points, and the quantization number per frequency band is equal to 16 bits. In this case, since minute ID information is added to an area having strong energy, it has little effect on the fingerprint pattern of the holder. According to the method in this case, the ID information of 32 bits is divided into 4 bits×3, 3 bits×4 and 2 bits×4, and successively added from a frequency band containing the frequency component of stronger energy. Subsequently, the result is transformed to a two-dimensional image by the inverse FFT 14 to form a pattern to be printed on the card, and a fingerprint pattern is printed on the card by the fingerprint pattern printer 15. The image thus printed is finished as being undiscriminable from the fingerprint pattern 12 of the holder itself, and thus the pattern looks like the original one even if the ID information is different.

Further, the ID information 9 of 32 bits is enciphered by the encipherer 16, and the magnetic information is formed on the card 25 by the magnetic tape forming machine 17.

By the above method is formed a card in which the ID information 9 of 32 bits is printed in both the magnetic data 18 and the pattern of the fingerprint pattern 19 of the card.

The fingerprint pattern 19 of the card 25 generated by the above method is first read by the fingerprint pattern reader 6 to transform the image to the frequency domain information by FFT 7 to obtain a frequency spectrum 20 of (fingerprint pattern +ID information). Subsequently, as shown in FIG. 4, the fingerprint pattern 12 of the holder itself is transformed to the frequency domain by FFT 11 to obtain a fingerprint data frequency spectrum 22. Further, the fingerprint data frequency spectrum 22 is subtracted from the frequency spectrum 20 of (fingerprint pattern+ID information) by the subtracter 8, whereby only a portion of ID information 21 is extracted at a portion having strong frequency components as shown in FIG. 5. The spectrum comprising only the ID information 21 is divided into 4 bits×3, 3 bits×4 and 2 bits×4, for example, and the data thereof are rearranged in the reverse order to the order when the ID information is beforehand written on the card, thereby returning the data to the ID information of 32 bits.

Further, as shown in FIG. 1, the magnetic data are read out by the magnetic reader 1 for the card to decode the codes of the information by the decoding processing 2 and extract the ID information 3 of 32 bits.

Subsequently, the 32-bit ID information 9 extracted from the fingerprint pattern of the card 25 is compared with the 32-bit ID information 3 extracted form the magnetic data of the card in the comparator 4. If they are the same ID information, the comparator 4 outputs "0". If they are different from each other, the comparator 4 outputs "1". If the output of the comparator 4 is "0", the judgment circuit 5 judges that the ID card is a normal (legal) card, and thus it shifts the process to subsequent ordinary card processing. If the output is "1", the judgment circuit judges that the ID card is an illegally copied card, and thus it ceases the card processing.

[Third Embodiment]

Next, the third embodiment according to the present invention will be described with reference to the accompanying drawings.

Figure 6:
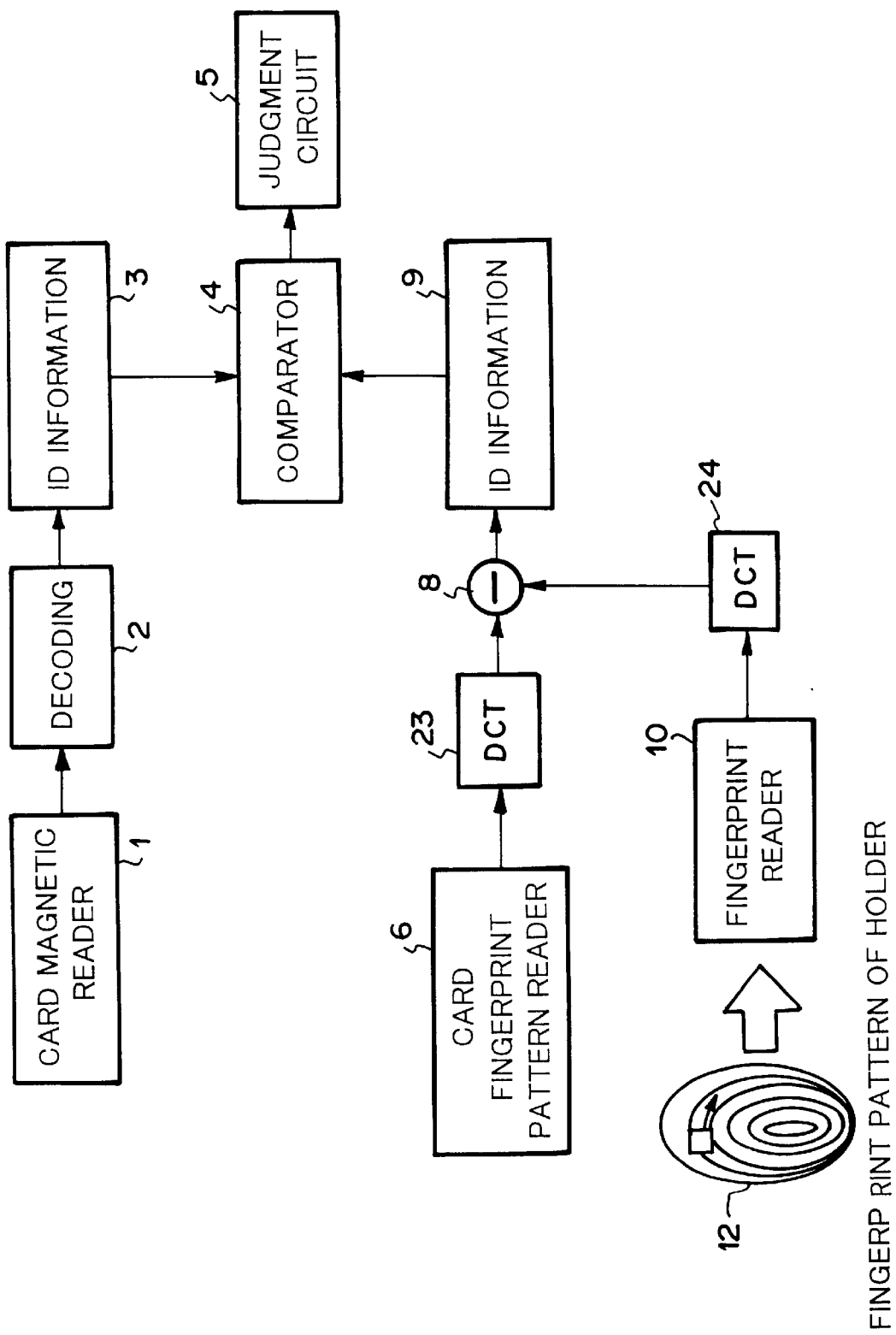
FIG. 6 is a block diagram showing a first embodiment.

Referring to FIG. 6, the principle of the third embodiment is basically identical to that of FIG. 1. DCT (discrete cosine transformation) used for image compression such as JPEG or the like is applied to the portion corresponding to FFT. DCT is one type of orthogonal transformation encoding processing, and it is an improved version of DFT (Discrete Fourier Transform). That is, image data are transformed with an orthogonal transformation matrix every block comprising 8 pixels×8 pixels, and the transformation result is quantized and replaced by encoded data to encode the image data. As in the case of FFT, the processing speed of DCT can be increased by a butterfly operation, and it uses the characteristic of image components in which the amount of frequency components is small. Any one of the equi-length encoding system based on non-linear quantization and the length-variable encoding system based on quasi-linear quantization. The DCT of this embodiment has the following advantage. That is, if an encoding error is varied in accordance with a block to be image-compressed, the block appears as a block distortion on a screen. Therefore, in the case of a screen in which the block distortion is remarkable, the encoding speed is increased. On the other hand, in the case of a screen in which the block distortion is not remarkable, the encoding speed is reduced, whereby the image quality is uniform as a whole.

In the transforming operation of the DCTs 23, 24, according to the first embodiment, the transformation of the frequency domain is performed for all the information of the fingerprint pattern. However, according to the second embodiment, the fingerprint pattern of the holder itself is beforehand divided into minute images (blocks) of 8×8 dots when the pattern of the card is formed, and printed on the card by using DCT. In this case, the ID information 9 is printed in all the areas into which the fingerprint pattern is minutely divided by 8×8 dots. Therefore, even when the card is scratched or the fingerprint of the holder itself is slightly damaged, the ID information can be extracted due to the correlation of the data in non-scratched portions by majority voting if the scratch or damage is limited to some degree.

Further, in the above embodiment, the ID information is added to the specific frequency component of the frequency spectrum of the image signal which is obtained from the fingerprint pattern by FFT or DCT. In this case, by specifying a characteristic area and a range of the fingerprint pattern, a fingerprint pattern gaining area and a range thereof at the actual fingerprint pickup time must be matched with them. However, this point can be solved by conforming them to the pickup characteristic of the fingerprint reader 10.

[fourth Embodiment]

The fourth embodiment of the present invention relates to a magnetic card ID information enciphering system, and a magnetic card is used as a card type recording medium.

Figure 7:
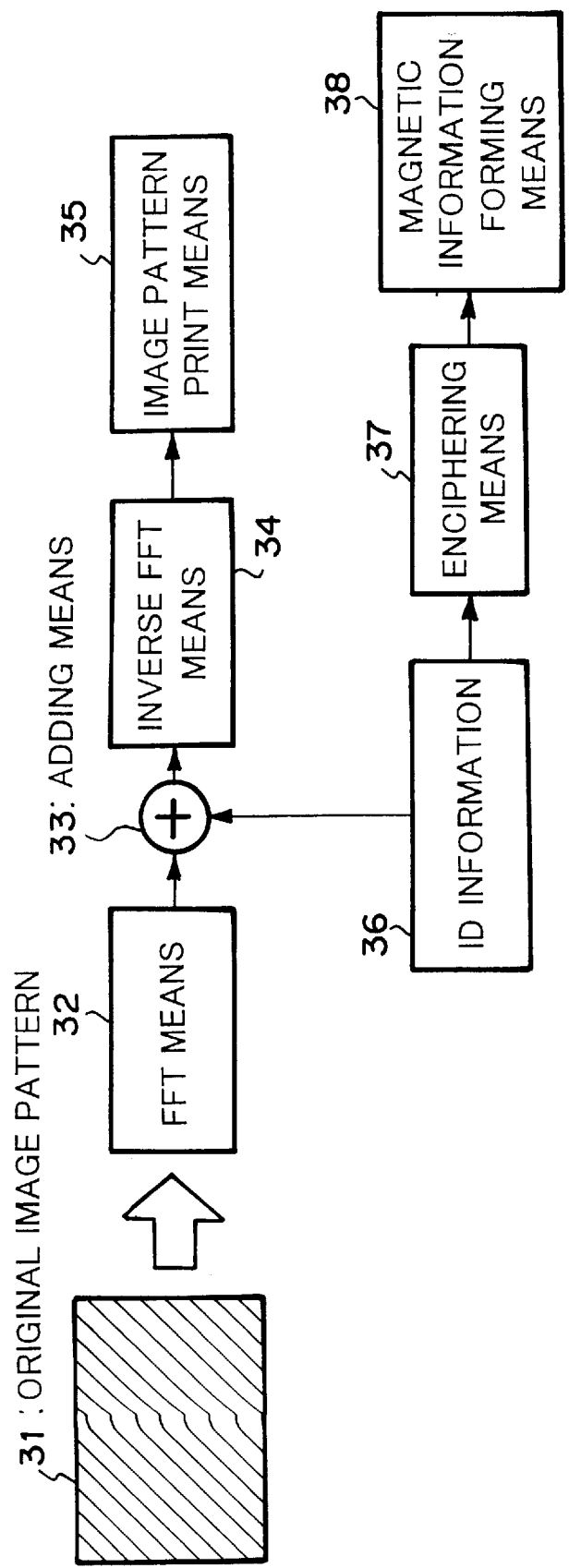
FIG. 7 is a block diagram showing the construction of the first embodiment of a magnetic card ID information enciphering system according to the present invention.

FIG. 7 is a block diagram showing the construction of the magnetic card ID information enciphering system. The magnetic card ID information enciphering system of this embodiment includes FFT means 32 for performing FFT (Fast Fourier Transform) on an original image pattern 31 which is an origin of a pattern to be printed on a magnetic card to transform the original image pattern 31 to frequency domain information (original image frequency spectrum 39, see FIG. 8), adding means 33 for generating information (ID information frequency spectrum 41, see FIG. 8) in which the ID information 36 specifying the user of the magnetic card is distributed on the frequency domain, and adding the original image frequency spectrum 39 and the ID information frequency spectrum 41, inverse FFT means 34 for restoring to the two-dimensional image pattern the frequency spectrum 40 (see FIG. 8) of (original image+ID information) serving as the frequency domain information generated by the addition of the adding means 33, image pattern print means 35 for printing the image pattern generated by the inverse FFT means 34 on the magnetic card so that the image pattern is used as the pattern of the magnetic card (see FIG. 10), enciphering means 37 for enciphering the content of the ID information 36 (no limitation is imposed on the enciphering manner), and magnetic information creating means 38 for writing the enciphered ID information 36 as the magnetic information in a magnetic recording portion such as a magnetic stripe (see FIG. 10) on the magnetic card.

Here, as the enciphering mode of the enciphering means 37 may be used a stream encipherment of a synchronous type or the like such as a block encipherment of DES, MULT12 or the like, a Vernam encipherment, an interchange encipherment or the like, a power surplus type encipher such as RAS, Rabin or the like based on an asymmetrical encipher system (open key encipherment), a knapsack type encipherment or the like. That is, it is not limited unless the use thereof is limited.

The constituent elements in FIG. 7 will be additionally described. The FFT means 32 performs FFT for division into the frequency bands of 25 points. Here, the quantization number per frequency band is set to 16 bits, for example. The enciphering means 37 enciphers the ID information 36 of 32 bits, for example (see FIG. 9).

Figure 20:
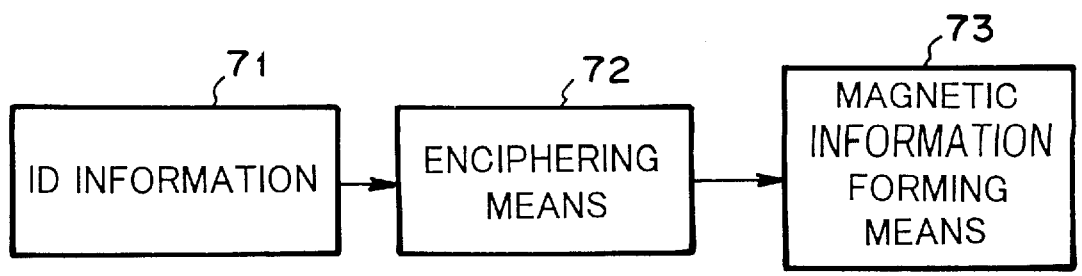
FIG. 20 is a block diagram showing the construction of a conventional magnetic card ID information enciphering system.

The enciphering means 37 and the magnetic information forming means 38 may be the means having the same name (see FIG. 20) and the same means as described in the first prior art.

Figure 8:
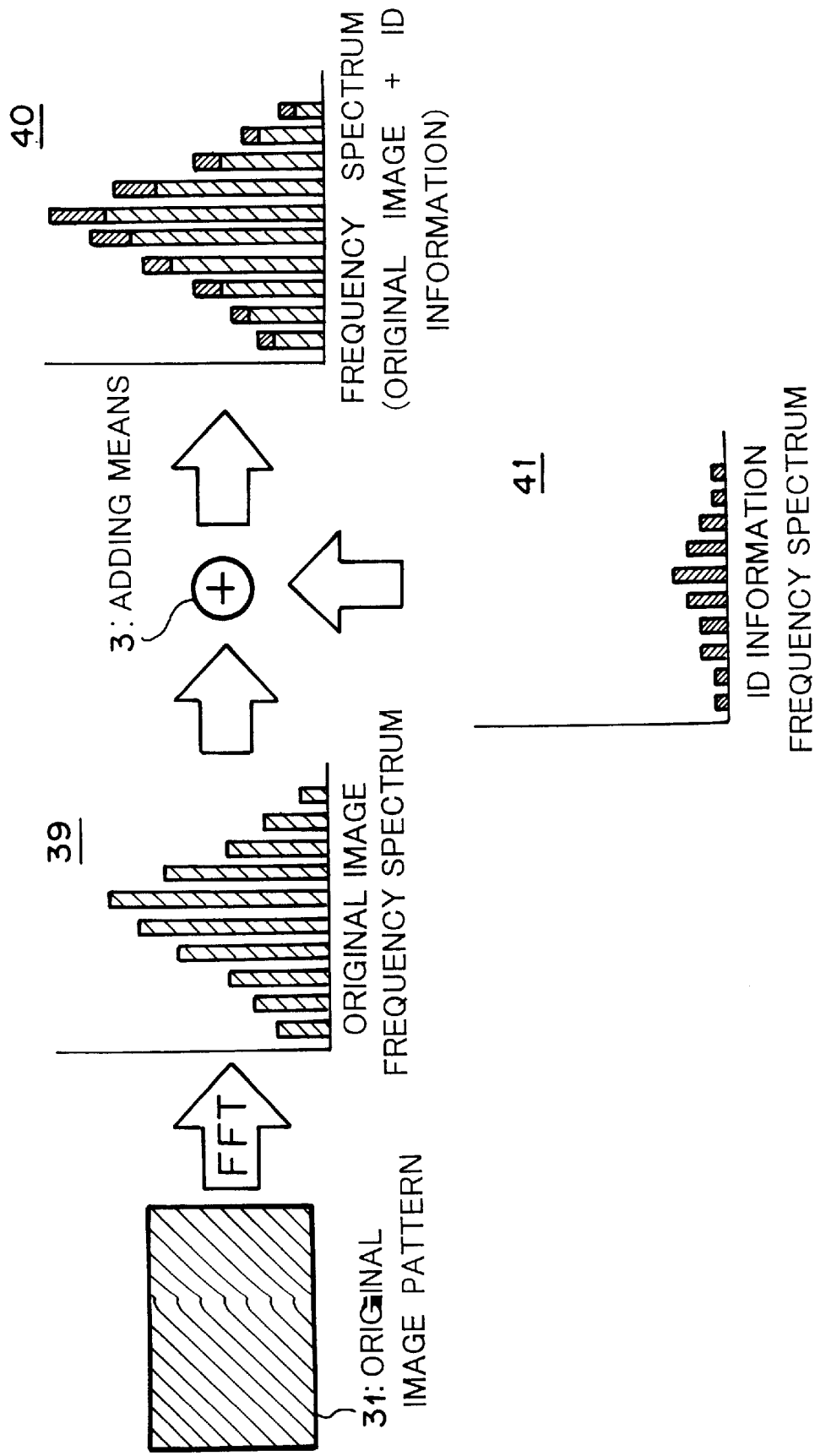
FIG. 8 is a diagram showing the principle of the magnetic card ID information enciphering system shown in FIG. 7.

FIG. 8 shows the principle of the magnetic card ID information enciphering system of this embodiment. FIG. 9 is a diagram showing the processing of the adding means 33 (the division processing of the ID information 36, etc.).

Further, FIG. 10 shows an example of a magnetic card 42 which is manufactured by the magnetic card ID information enciphering system of this embodiment. The magnetic card 42 includes a pattern 44 into which ID information is printed, and a magnetic stripe 43 containing data obtained by enciphering the ID information. The holder of the magnetic card 42 individually or collectively holds and suggests an ID card certifying the holder itself, a cash card for a bank, a credit card or the like, where the holder is allowed to use the magnetic card 42 variously.

Figure 11:
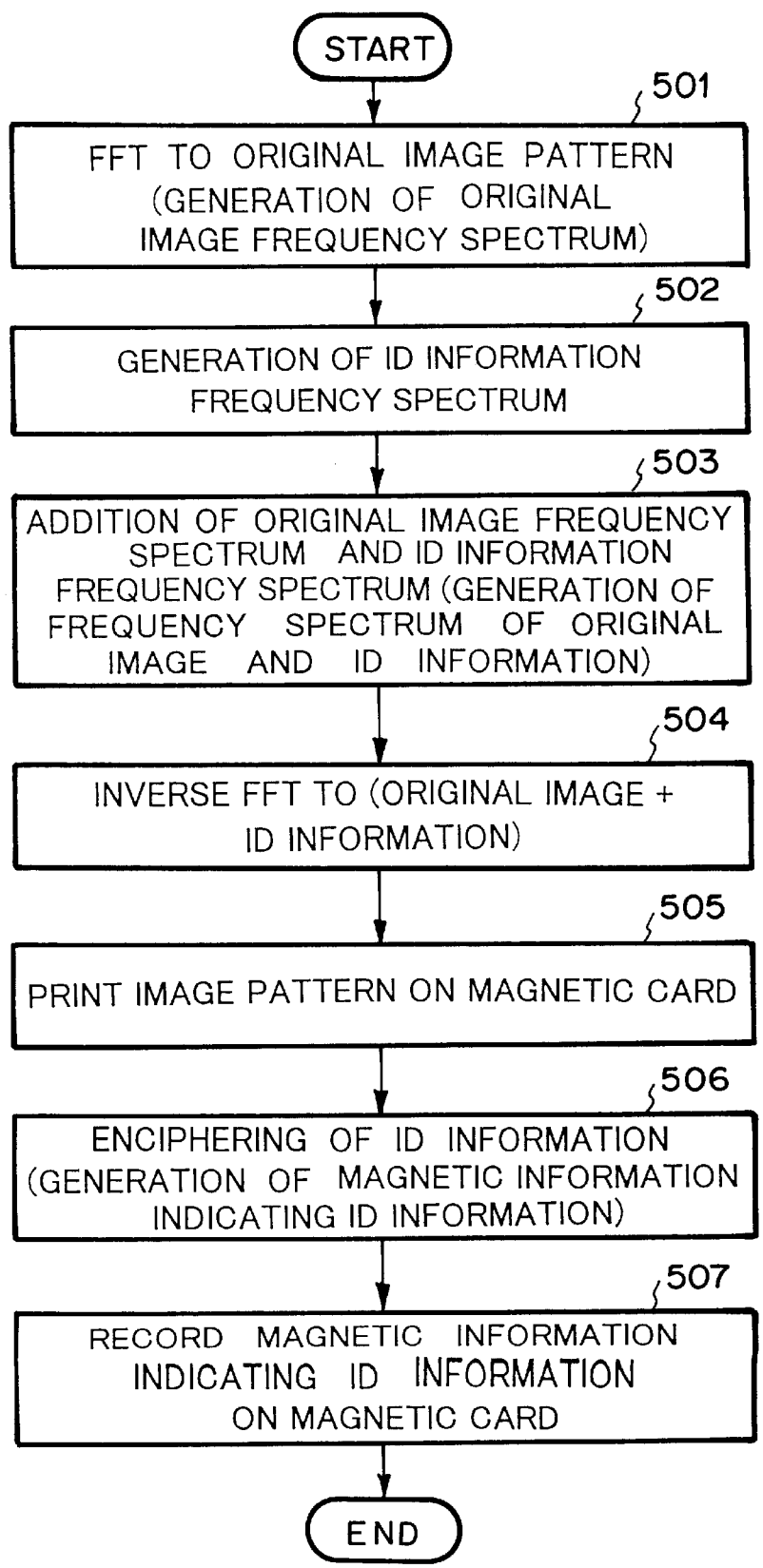
FIG. 11 is a flowchart showing the processing of the magnetic card ID information enciphering system shown in FIG. 7.

FIG. 11 is a flowchart showing the magnetic card ID information enciphering system of this embodiment. This processing comprises a FFT step 501, an ID information frequency spectrum generating step 502, a (original image+ID information) frequency spectrum generating step 503, an inverse FFT step 504, an image pattern print step 505 an enciphering step 506, and a magnetic information recording step 507.

Next, the operation of the magnetic card ID information enciphering system of this embodiment thus constructed will be described in detail with reference to FIGS. 7 to 11.

First, an original image pattern 31 serving as an origin to a pattern to be printed on the magnetic card is prepared. At this time, as the original image pattern 31 is beforehand prepared such a pattern that when it is afterwards transformed to frequency domain information, no overflow occurs irrespective of addition of the ID information 36 to the pattern.

The FFT means 32 performs the Fast Fourier Transform (FFT) on the original image pattern 31 so as to transform the original image pattern 31 to the frequency domain information (step 501 of FIG. 11), whereby the original image pattern 31 is transformed to an original image frequency spectrum 39 as shown in FIG. 8.

Upon viewing the distribution condition of the original image frequency 39 generated by the FFT means 32, the adding means 33 generates an ID information frequency spectrum 41 as shown in FIGS. 8 and 9 (step 502). That is, when the ID information 36 is composed of 32 bits like this embodiment, the 32 bits are divided into 4 bits×3, 3 bits×4 and 2 bits×4 so that the distribution of 32 bits is made similar to the distribution condition of the original image frequency spectrum 39, thereby generating an ID information frequency spectrum 41. That is, the 32 bits are distributed (divided) so that a portion having a higher number of bits is preferentially distributed (allocated) to a frequency component portion having stronger energy of the original image pattern 31, and this operation is successively repeated until a portion having the lowest number of bits is distributed (allocated) to a frequency component portion having the weakest energy of the original image pattern 31, whereby the ID information frequency spectrum 41 is generated. However, it is needless to say that this embodiment can be implemented even when the above "the processing of establishing similarity between the distribution condition of the original image frequency spectrum 39 and the distribution condition of the ID information frequency spectrum 41" is not performed.

Subsequently, the adding means 33 adds the original image frequency spectrum 39 and the ID information frequency spectrum 41 as shown in FIG. 8 to generate (original image+ID information) frequency spectrum 40 (step 503).

In this case, the energy of the ID information frequency spectrum 41 is set to be more minute as compared with the energy of the original image frequency spectrum 39, and thus the existence of the ID information 36 (ID information frequency spectrum 41) has little effect on the image pattern serving as the pattern on the magnetic card. Further, in this embodiment, the distribution condition of the original image frequency spectrum 39 and the distribution condition of the ID information frequency spectrum 41 are set to be similar as much as possible in shape (see FIG. 8), so that the effect of the ID information 36 on the image pattern of the magnetic card is further reduced.

The inverse FFT means 34 performs the inverse FFT on the (original image+ID information) frequency spectrum 40 generated in step 503 t restore the (original image+ID information) frequency spectrum 40 to an image pattern (step 504). The image pattern thus generated is visually undiscriminable from the original image pattern 31.

The image pattern print means 35 prints the image pattern as a pattern on the magnetic card (step 505). The patters on the magnetic cards thus formed (printed) look perfectly like each other irrespective of the difference in ID information 36 if the original image patterns 31 thereof are identical to each other.

Further, the enciphering means 37 enciphers the data of the ID information 36 so that it is difficult to analyze the data in the same manner as the conventional technique of recording the magnetic information on the magnetic card (step 506).

The magnetic information forming means 38 writes the magnetic information representing the ID information enciphered in step 506 into the magnetic recording portion (the magnetic stripe in FIG. 10) (step 507). With the above operation, the ID information 36 of the magnetic card is recorded/printed (stenciled) both in the format of the magnetic information and in the format of the pattern.

In the above embodiment, the ID information is added to the original image pattern on the magnetic card (recording medium) so that the image signal on the magnetic card which is apparently viewed is set to be visually undiscriminable from the original image pattern. However, the ID information can be read out from the enciphered magnetic card by a specific decoder, and on the basis of the judgment as whether the ID information thus read is coincident with the ID information indicated by the actual holder of the magnetic card, it is judged whether the holder is an legal holder or an illegal holder.

[Fifth Embodiment]

The magnetic card ID information enciphering system of the fifth embodiment will be described.

Figure 12:
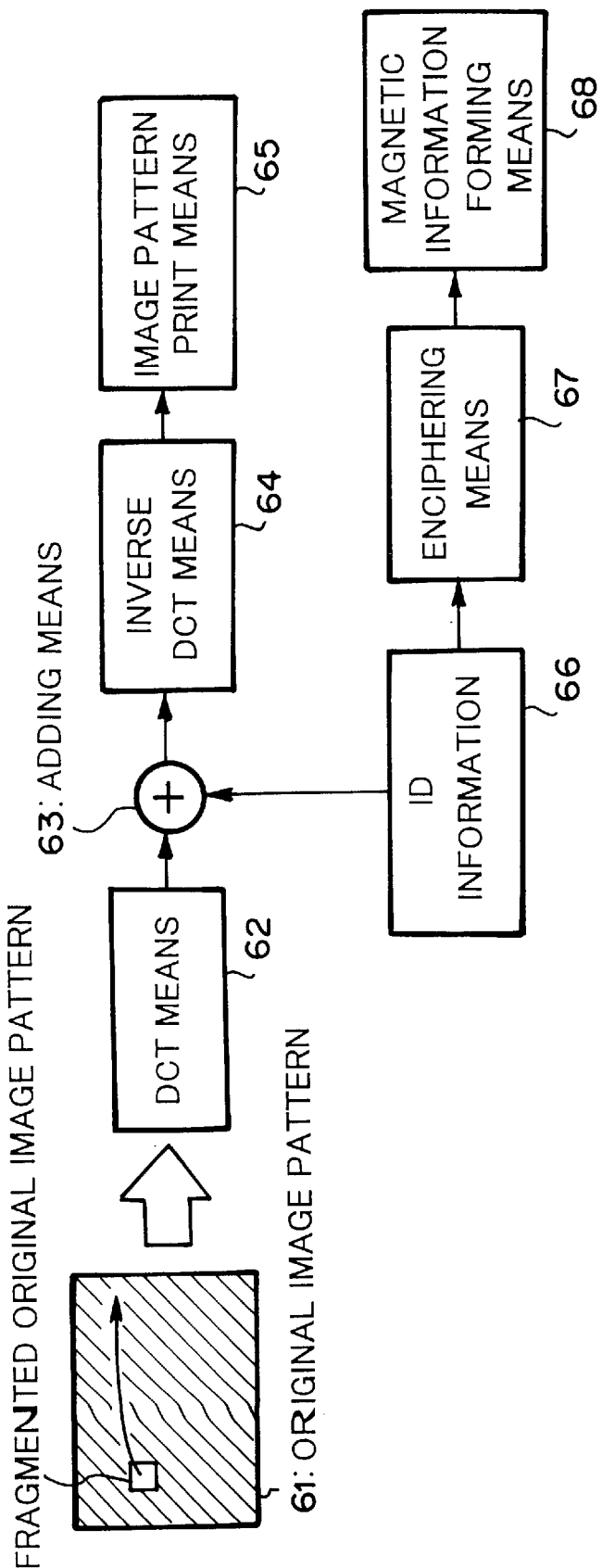
FIG. 12 is a block diagram showing the construction of a fifth embodiment of the magnetic card ID information enciphering system of the present invention.

FIG. 12 is a block diagram showing the construction of the fifth embodiment of the magnetic card ID information enciphering system according to the present invention. The magnetic card ID information enciphering system of this embodiment includes DCT means 62 for transforming the original image pattern 61 serving as the origin to a pattern to be printed on the magnetic card to frequency domain information by DCT, adding means 63 for generating information in which the ID information 66 specifying the user of the magnetic card is distributed on the frequency domain, and adding the information thus generated to the frequency domain information generated by the DCT means 62, inverse DCT means 6 for restoring the frequency domain information added by the adding means 63 to a two-dimensional image pattern by inverse DCT, image pattern print means 65 for printing the image pattern generated by the inverse DCT means 64 on the magnetic card so that it is used as a pattern on the magnetic card, enciphering means 67 for enciphering the content of the ID information 66 (no limitation is imposed on the enciphering way), and magnetic information forming means 68 for writing the enciphered ID information 66 as magnetic information at a magnetic recording portion such as a magnetic stripe or the like on the magnetic card.

The adding means 63, the image pattern print means 65, the enciphering means 67 and the magnetic information forming means 68 of this embodiment are similar to the adding means 33, the image pattern print means 35, the enciphering means 37 and the magnetic information forming means 38 of the fourth embodiment, respectively.

As shown in FIG. 12, the principle of the magnetic card ID information enciphering system of this embodiment is basically identical to that of the fourth embodiment shown in FIG. 8. However, in this embodiment, DCT means 62 which performs DCT (DCT on the condition that the original image pattern 61 is fragmented into fragmented original image patterns) used for image compression such as JPEG (Joint Photographic Coding Experts Group) or the like is used for the portion corresponding to the FFT means 32 in FIG. 7, and inverse DCT means 64 is used for the portion corresponding to the inverse FFT means 34.

Next, the characteristic feature of this embodiment will be descried.

In the fourth embodiment, the FFT means 32 performs the conversion to frequency domain information while all the information of the original image pattern is targeted. However, the DCT means 62 of the second embodiment divides the original image pattern into fragmented original patterns (fine image patterns of 8×8 dots), and then DCT is performed on each fragmented original image pattern.

Further, the adding means 63 distributes the ID information 66 on the frequency domain and then adds the ID information 66 of the frequency domain to each information obtained by subjecting each fragmented original image pattern to DCT.

In the magnetic card ID information enciphering system of this embodiment, the ID information 66 is printed into all the fragmented original image patterns as descried above. Therefore, even when the magnetic card is partially scratched and a part of the image data are damaged, the accurate ID information 66 is still printed at image portions which are not scratched.

Figure 13:
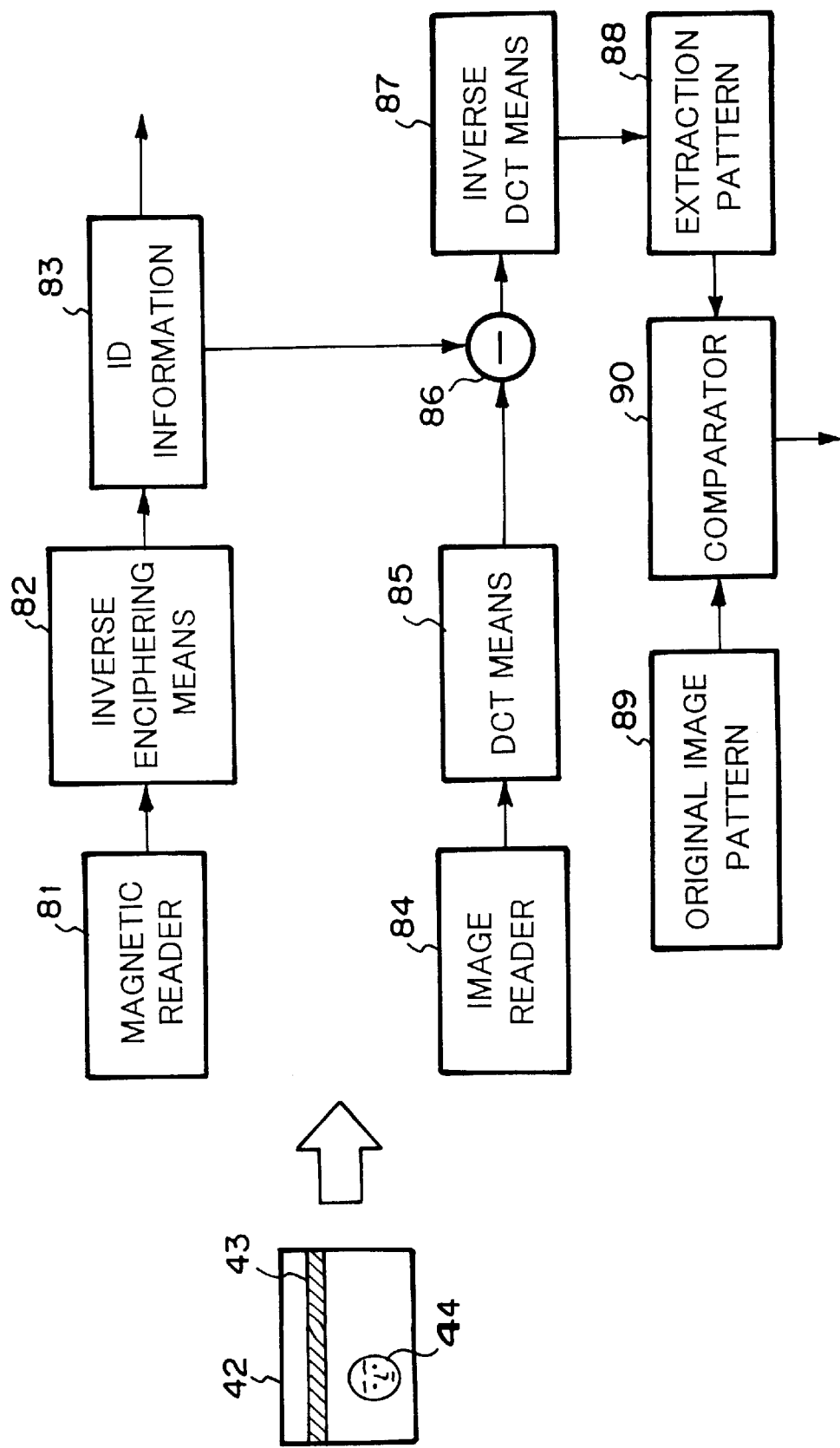
FIG. 13 is a block diagram showing the construction of the fifth embodiment of a magnetic card ID information enciphering decoder of the present invention.

A decoding system for the magnetic card ID information enciphering system will be described with reference to FIG. 13. The card type recording medium 42 which contains the image data of the pattern 44 having the accurate ID information 66 printed therein, and the magnetic stripe 43 on which the ID information is recorded as an enciphered code, is inserted into a predetermined position of the magnetic card information decoder. In the magnetic reader 81, the recording cord which is recorded on the magnetic stripe 43 is transformed to electrical signals by a magnetic head which moves relatively to the magnetic card 42. In inversely-enciphering means 82, the enciphered recording code is transformed to a normal ID information signal in the opposite system to the enciphering system of the enciphering means 67 to obtain ID information 83. On the other hand, in an image reader 84, the area of a predetermined pattern 44 is read out as an image signal by a photoelectric transducing element directly or while scaled down. The image signal is subjected to DCT every sub block by the DCT means as in the case of the DCT means 62. Subsequently, the frequency spectrum data of the ID information 83 is subtracted from the image signal which has been subjected to DCT, and the transformation which is opposite to that of the DCT means 85 is performed on the subtraction result in the inverse DCT means 87 to obtain an extraction pattern 88.

Subsequently, the face of a holder who holds the card type recording medium is obtained by a photographing operation or the like, or the original image of a copyrighted work itself is digitally transformed as an original image pattern 89, and compared with the digital signal of the extracted pattern by a comparator 90. As a result, if it is judged that there is no difference therebetween and thus they are the same pattern, the holder is certified as a legal card holder. On the other hand, when the difference between them is large, the holder is judged to be an illegal card holder.

In this case, if the detected ID information 83 and the ID information indicated by the holder of the magnetic card are coincident with each other, the holder of the original pattern concerned is judged to be coincident. If not so, it is judged that the holder of the magnetic card picks up the magnetic card or has a dishonest act. When the original image pattern itself is a valuable copyrighted work, it can be immediately judged whether the holder of the magnetic card is a true holder or not if the original image pattern is printed on the magnetic card as described above. Therefore, the forgery and illegal use of the magnetic card are found out, and thus the security can be enhanced.

In the above embodiment, the decoder is designed to support the magnetic ID information enciphering system shown in FIG. 12. However, the magnetic card ID information enciphering system of the fourth embodiment may be constructed to perform the above decoding operation by changing the DCT means 85 and the inverse DCT means 87 to the FFT means 32 and the inverse FFT means 34.

[Sixth Embodiment]

Figure 14:
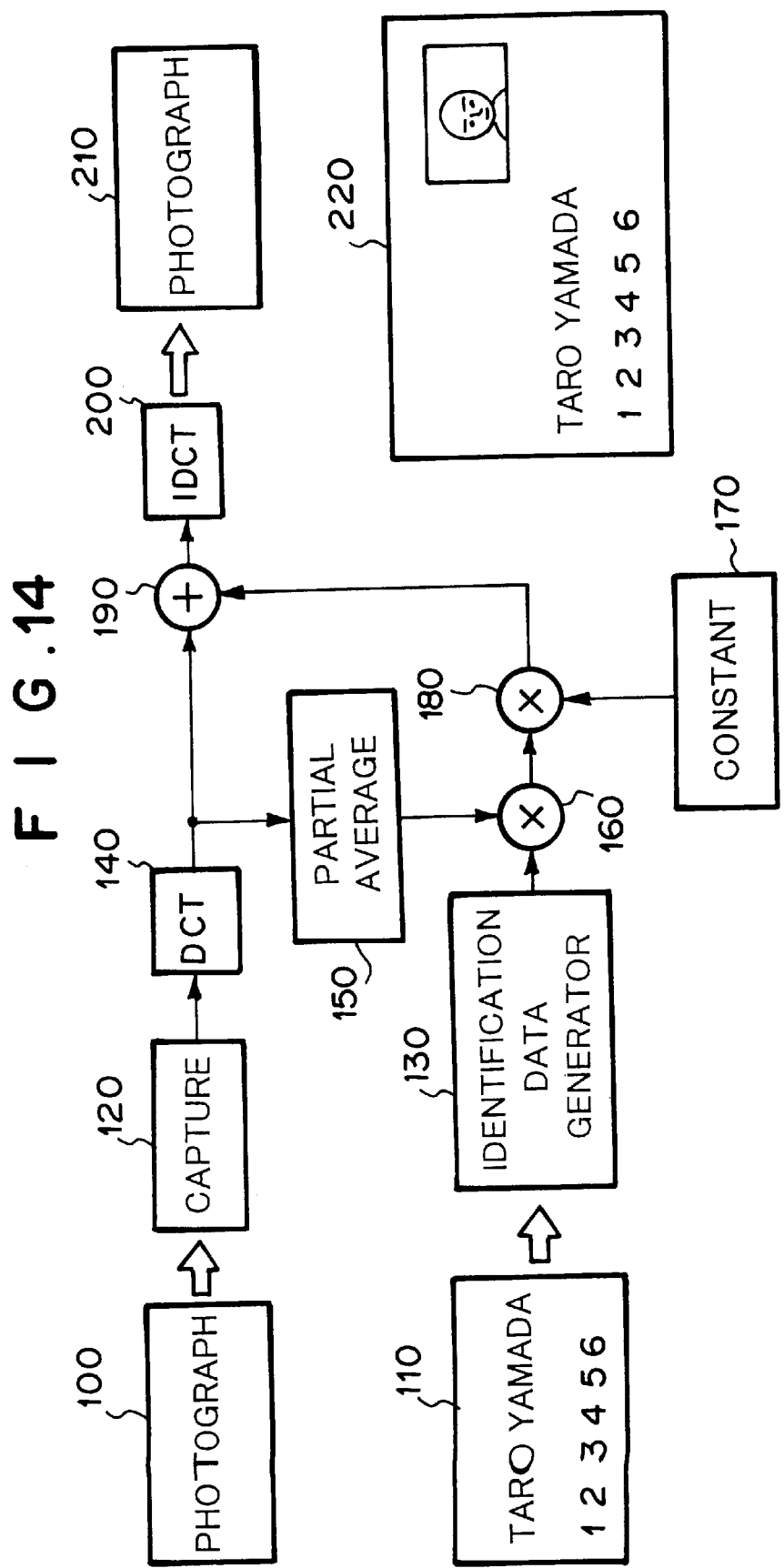
FIG. 14 is a diagram showing the flow of forming an ID card according to a sixth embodiment of the present invention.
Figure 15:
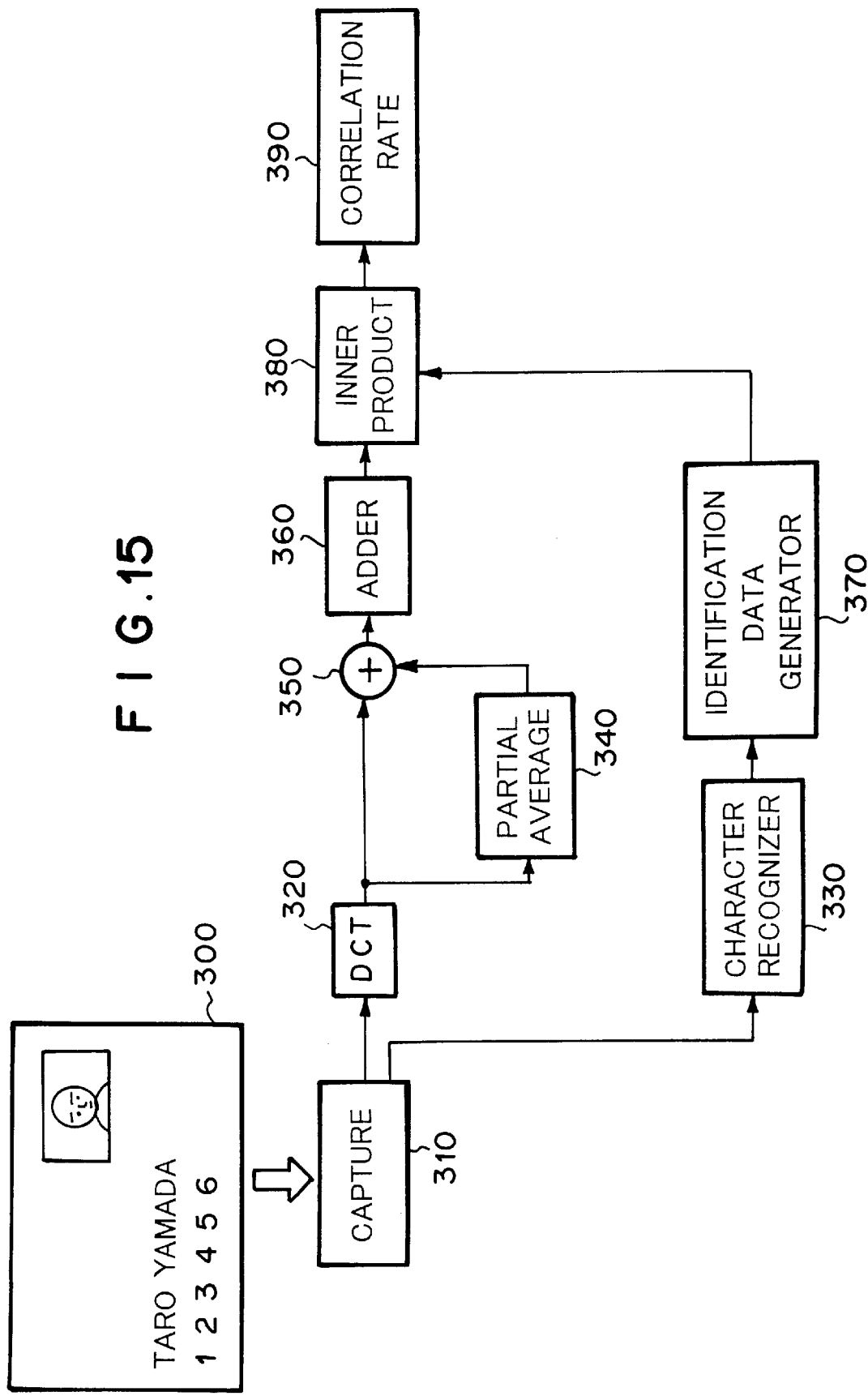
FIG. 15 is a flowchart showing an ID card checking processing of the sixth embodiment of the present invention.
Figure 16A:
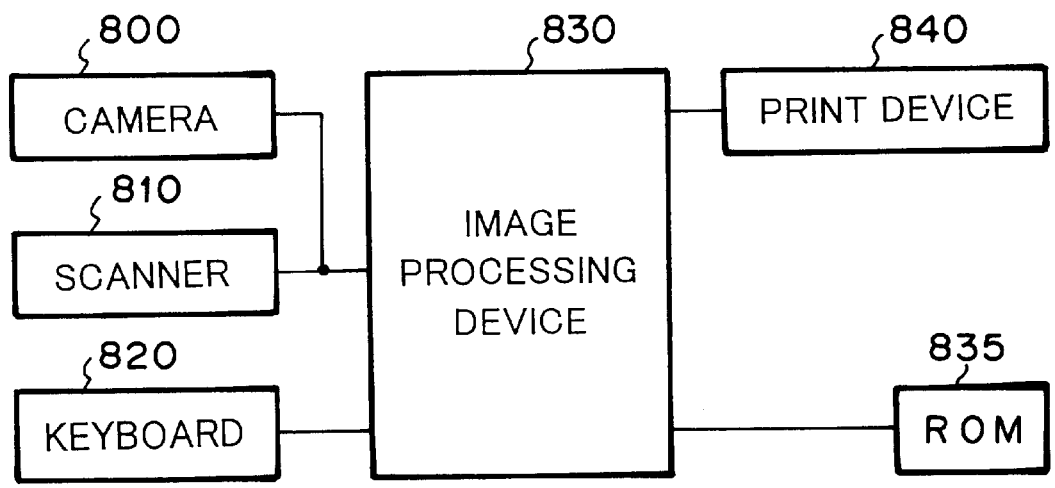
FIGS. 16A and 16B are diagrams showing the construction of an ID card forming system and an ID card checking system of the sixth embodiment of the present invention respectively.

FIG. 14 is a block diagram showing formation of an ID card which is one type of card type recording medium of the sixth embodiment of the present invention together with a signal flow. FIG. 15 is a block diagram showing a checking process for checking the ID card of the sixth embodiment. FIG. 16 shows a system for issuing the ID card of the sixth embodiment, and FIG. 17 shows a system for checking the ID card of the sixth embodiment.

In FIG. 14, reference numeral 100 represents a photograph of the normal (true) holder of an ID card. Reference numeral 110 represents items which are mentioned on the ID card 220. The name of the holder, the name of the holder's post, the registration number and the employee number are mentioned on the ID card 220 when the ID card is an ID card for a public servant or a company employee. When the ID card is an ID card for a student, the name of the holder, the name of the holder's faculty, the student number, etc. are mentioned on the card. Reference numeral 120 represents a capture for reading the photograph 100 as image data. Reference numeral 130 represents an identification data generator for generating identification data on the basis of the mentioned items 110 of the ID card 220 by a calculation. The identification data may be generated by generating a random number on the basis of the name and the employee number. Reference numeral 140 represents a DCT unit having a function of transforming the image data taken by the capture 120 to spatial frequency components. Reference numeral 150 represents a partial average calculator 150 for calculating the average value of the absolute values at three near points of the spatial frequency components. This partial average is multiplied with the identification data in a multiplier 160, and the multiplication result is multiplied by a constant $\alpha$ in a multiplier 180. The output of the multiplier 180 is added to the output of the DCT unit 140 in an adder 190, and the addition result is supplied to an IDCT (Inverse Discrete Cosine Transform) unit 200. The constant $\alpha$ is a scaling factor. Reference numeral 200 represents an IDCT unit having a function of transforming the spatial frequencies to image data which can be seen by humans. Reference numeral 210 represents a photograph in which the identification data are embedded, and the photograph 210 and the mentioned items 110 are printed on the ID card 220.

Next, the certifying/checking means when the ID card thus formed is actually used will be described.

In FIG. 15, on an ID card 300 are printed a photograph embedded with identification data, and mentioned items on which the identification data are generated. The capture 310 photoelectrically transforms and reads the image portion of the photograph of the ID card to separate the photographic image and the mentioned-item portion as image data. A DCT unit 320 has a function of transforming the image data separated in the capture 310 to spatial frequency components. A character recognizer 330 transforms the image data of the mentioned-item portion separated in the capture 310 to characters by the character recognition. A partial average calculator 340 calculates the average value of the absolute values at three neighboring points of the spatial frequency components.

An identification data generator 370 calculates the identification data on the basis of the mentioned-item data separated from the capture 310. An inner product calculator 380 has a function of calculating the inner product between the identification data extracted from the spatial frequencies of the image and the identification data generated from the mentioned items. The operation of a divider 350 and an adder 360 will be described later.

The ID card forming operation and the ID card checking operation will be described hereunder in more detail.

First, the ID card forming operation will be described.

A person who needs an ID card prepares a photograph 100 and mentioned items required to form identification data. In this case, the mentioned items are set to the employee number. A person in charge of ID card formation picks up the photograph into an image processing device 830 by a camera 800 or a scanner 810 as shown in FIG. 16A.

Further, the mentioned items 110 are input through a keyboard 820 by the person in charge of the ID card formation. The image data of the photograph 110 which is picked up into the image processing device 830 and the mentioned-item data 110 are processed along the flow of FIG. 14. The pickup image data are transformed to spatial frequency components in the DCT unit 140. In the identification data generator 130, identification data having a normal distribution in which the average is equal to zero and the dispersion is equal to 1 are generated on the basis of the mentioned-item data which are input from the keyboard 820. The following calculation is performed between the identification data and the data which are transformed to the spatial frequency components to embed the identification data into the spatial frequency components.

The spatial frequency components after DCT in the DCT unit 140 are represented in the order from a lower spatial frequency component as follows:

$$f(1), f(2), \ldots, f(n)$$

and the identification data are represented as follows:

$$w(1), w(2), \ldots, w(n)$$

The following equation is calculated for each i:

$$F(i)=f(i)+\alpha \times \text{avg}(f(i)) \times w(i)$$

The partial average avg(f(i)) is calculated in the partial average calculator 150 as described above.

The IDCT unit 200 subjects the calculation result to inverse cosine transformation to prepare a photograph 210 in which the identification data are embedded. The photograph 210 and the mentioned items 110 are printed on the ID card by a printing device 840, thereby completing the ID card 220.

In FIG. 16A, a program for executing the processing of the image processing device shown in FIG. 16A is stored in a ROM 835. The ROM 835 may be replaced by a hard disc, a floppy disc or the like.

Next, the method of checking the ID card will be described.

Figure 16B:
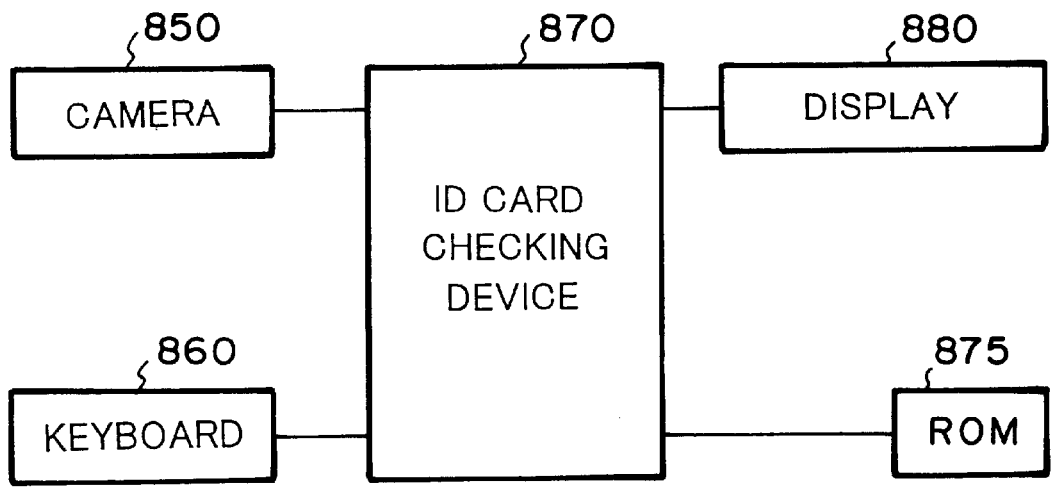
Figure 17:
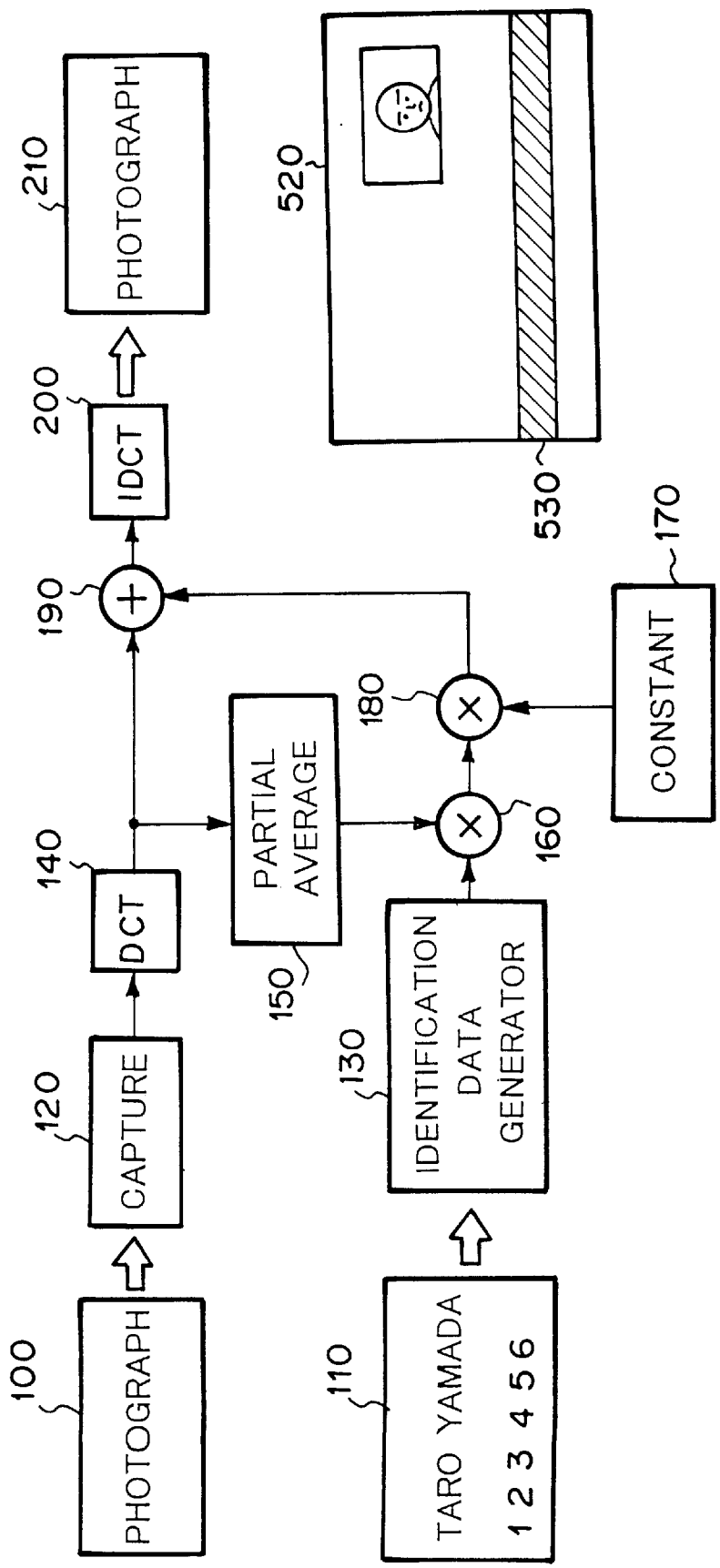
FIG. 17 is a flowchart showing the ID card forming processing of a seventh embodiment of the present invention.

The image of the ID card on which the photograph embedded with the identification data and the mentioned items are printed is picked up by the camera 850 shown in FIG. 16B and then input to a checking device 870. The data which are taken into the checking device 870 are processed along the flow of FIG. 15. The read-in image data are separated into the photograph portion and the mentioned-item portion in the capture 310, and the these portions are output to the DCT unit 320 and the character recognizer 330 respectively.

In the DCT unit 320, the spatial frequency components are represented in the order from a lower frequency component as follows:

$$F(i), F(2), \ldots, F(n)$$

The partial average calculator 340 calculates the partial average avg (F(i)) of the absolute values at three neighboring points of F(i). The identification data extracted from the image data is represented by W(i), and the partial average is calculated from the following equation:

$$W(i)=F(i)/\text{avg}(F(i))$$

The adder 360 calculates the total sum WF (i) of the overall image every i for W(i).

On the other hand, the character recognizer 330 the mentioned items are reproduced as characters from the image data of the mentioned-item portion by the character recognition. On the basis of the mentioned-item data from the character recognizer 330, the identification data generator 370 generates identification data having a normal distribution which has an average value of zero and a dispersion of 1.

Subsequently, the inner calculator 380 calculates the vector inner product between the identification data W(i) and WF(i). That is, the following equation is calculated:

$$C=(WF \times w)/(WFD \times wD)$$

Here, $$WF=(WF(1), WF(2), \ldots, WF(n)),$$

$$w (w(1), w(2), \ldots, w(n))$$

WFD represents the absolute value of a vector WF, and wD represents the absolute value of a vector w. If the value C is not less than a predetermined value, it is judged that there is correlation between the identification data embedded into the photograph and the mentioned items, and it is displayed on a display 880 that the ID card is true.

In FIG. 16B, a program for making the checking device 870 perform the operation shown in FIG. 15.

Next, the case where the ID card is forged will be described. It is the simplest forging way that only the photograph on the ID card is replaced by another. In this case, however, when the correlation between the identification data extracted from the image data and the mentioned items is checked at the check stage, the value C is approximately equal to zero. This is because the identification data generated on the basis of the mentioned items are not embedded into the photograph. Accordingly, it is possible to easily judge that the ID card is forged.

As another forging way, identification data are generated from mentioned items and embedded into a photograph, and then the photograph embedded with the identification data is printed on a card. In this case, the calculation equation of a random number for generating the identification data is not known, and identification data which are different from the identification data of the normal (legal) card are generated. Therefore, the value C which indicates the correlation is equal to zero at the check stage, and thus the card is judged to be forged.

As another forging way, a photograph is carefully checked pixel by pixel to extract identification data and find out the calculation equation. In this case, identification data is inserted into a photograph when it is divided to spatial frequency components. Accordingly, it is impossible to investigate the identification data from the photograph after IDCT. That is, the identification data are not embedded into specific pixel portions.

In the above embodiment, the system which makes it hard to decipher enciphered data is used together with the electronic watermark system. In addition to the above systems, a system which makes it harder to decipher enciphered data, that is, a system which makes it more difficult to forge ID cards, may be further used as a data hiding system by using a data compression method accompanying loss (Lossy Compression), a data compression method accompanying information loss (Lossless Compression) or a spectrum spreading technique.

[Seventh Embodiment]

Figure 19A:
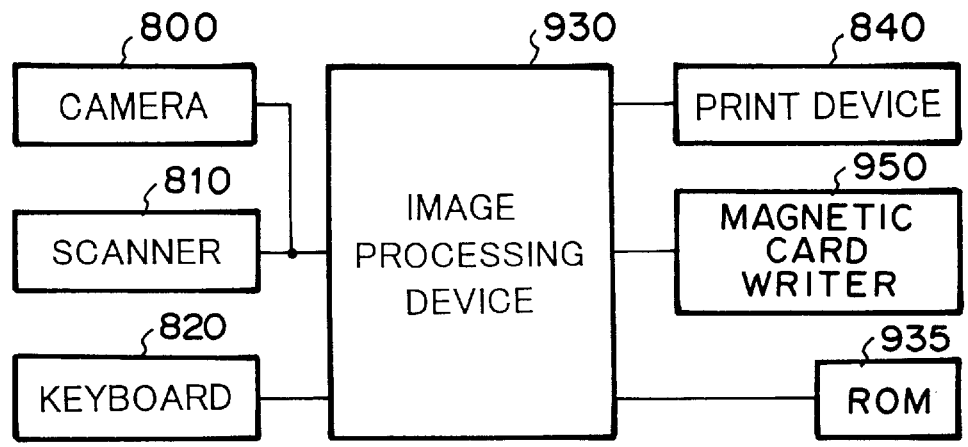
FIGS. 19A and 19B are diagrams showing the construction of an ID card forming system and an ID card checking system of the seventh embodiment of the present invention respectively.

Next, a seventh embodiment according to the present invention will be described. FIG. 17 shows a flow of forming an ID card which is one type of card type recording medium according to the seventh embodiment. FIG. 18 shows a flow of checking the ID card of the seventh embodiment. FIG. 19A shows a system for issuing an ID card according to the seventh embodiment, and FIG. 19B shows a system for checking the ID card of the seventh embodiment.

In the seventh embodiment, the ID card 520 is provided with a magnetic recording portion 530. The name and the employee number are recorded at the magnetic recording portion, and also printed on the surface of the ID card. That is, as shown in FIG. 17 and FIG. 19A, the process is identical to that of the sixth embodiment until a photograph embedded with identification data is formed. However, in order to form an ID card, the photograph 100 is printed on the IC card, and the mentioned items 110 such as the name and the employee number are embedded as identification data into the image data of the photograph while the mentioned items 110 (identification data) are directly transformed to magnetic recording data, or enciphered and then transformed to magnetic recording data, and then recorded at the magnetic recording portion 530 by using a magnetic card writer 950.

Figure 19B:
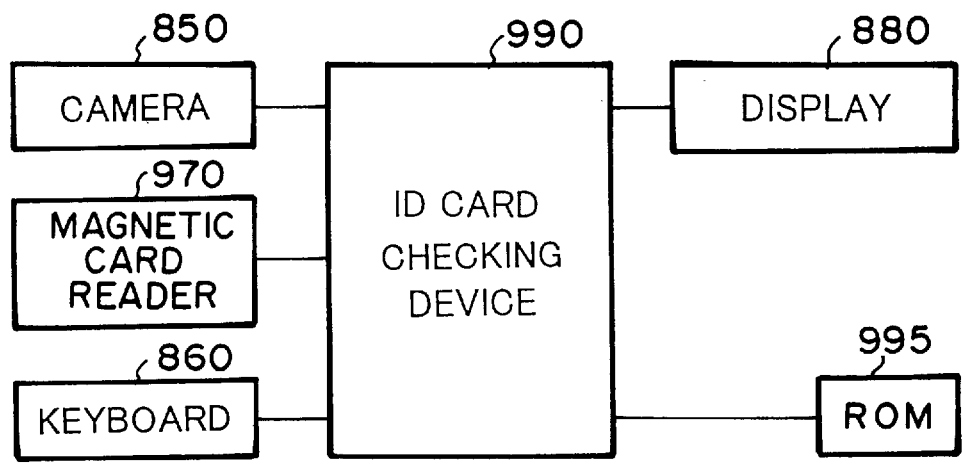

With respect to the checking device, the photograph on the ID card 600 is read out by a camera 850 as shown in FIGS. 18 and 19B in the same manner as the sixth embodiment, and the information on the name, etc. is read in from the magnetic recording portion 610 through a magnetic card reader 970. The processing after the read-in is identical to that of the sixth embodiment. That is, the photograph is transformed to image data by the capture 310 and subjected to DCT every block to obtain DCT data. The DCT data is divided by the partial average thereof, and the result is added to calculate the total of the overall image WF(i) and calculate the vector inner product of the identification data recorded on the magnetic card. On the basis of the calculation result, it is judged whether the holder is a true holder or the ID card is forged.

As described above, the identification data or the data obtained by enciphering the identification data are recorded on the magnetic stripe portion, thereby making it difficult to recognize the data on the name, etc. on the basis of which the identification data are created, and thus the forgery is more difficult.

In the above embodiment, by using the electronic watermark technique, the forgery is made more difficult. In the above embodiment, the identification code is watermarked into the face photograph on the ID card. However, in place of the face photograph, a fingerprint or a retina which can specify a personal may be used, and also in place of the identification data, ID information which respects memories of a personal may be used.

Further, in the above-described embodiments, it is the top object to judge the coincidence between a card owned by a holder and the true card holder on the basis of the image information and the ID information on the card type recording medium in combination with the enciphering technique, and these embodiments may be applied to many cards containing novel cards which will be issued in the future, such as a credit card, a telephone card, a cash card, an employee card, a student card, a health insurance card, etc. Further, a system using a magnetic action in which data are magnetically recorded on and read out from a magnetic stripe is basically lower in cost and higher in reliability. However, the present invention may be applied to other recording systems such as an optical system, a magneto-optical system, etc. It is apparent that the present invention is not limited to the above-described embodiments.

According to the present invention, the ID information can be verified dually on the basis of the information of the magnetic card and the image information embedded with the ID information. Accordingly, in a card check work, it can be easily judged whether the card is illegally forged or an original card. This is because the ID information is printed into the patter of the card so that a third party cannot find that the ID information is embedded into a portion other than the magnetic portion of the magnetic card. Further, even when the data at the magnetic portion of the magnetic card are damaged, the confirmation of the ID information can be easily performed. Accordingly, even when the magnetic data are damaged due to an external magnetic effect, the ID information can be read out to judge whether the card is the original card because the ID information is printed at the pattern portion of the magnetic card.

Still further, according to the present invention, the ID information can be recorded/printed on the magnetic card in the dual form, that is, in combination of magnetic information and image information. Therefore, the copy of the magnetic card is difficult, and thus the forgery of a magnetic card by a third party can be prevented. The reason why such an effect is obtained resides in that the ID information is embedded into the pattern of the magnetic card so that any third party cannot recognize that the ID information is inserted into a portion other than the magnetic portion of the magnetic card.

That is, with respect to the magnetic card which is manufactured according to the magnetic card ID information enciphering system of the present invention, when only the magnetic information is copied, the magnetic card is judged not to be identical to the original card unless the pattern portion is copied. Therefore, the forgery of the magnetic card is extremely difficult. It is very difficult to a nonprofessional to find that the ID information is embedded into the pattern because the energy of the frequency components corresponding to the original image pattern of the pattern is stronger (higher) than the frequency components corresponding to the ID information. Even if a nonprofessional finds the difference therebetween, any body cannot imitate the ID card unless the original pattern is obtained.

Further, even when the data at the magnetic recording portion of the magnetic card is broken, the confirmation of the ID information can be easily performed. Accordingly, even when the magnetic information is damaged by an external magnetic effect, the ID information embedded into the pattern is read to easily restore the ID information of the magnetic information. Such an effect can be obtained because the pattern portion is not effected by the external magnetic action, and the ID information embedded in the pattern is not effected by the magnetic action and thus not damaged by any magnetic factor.

Still further, by applying the present invention, it is difficult to forge an ID card which is one kind of card type recording medium of the present invention. For example, even when the face photograph of an ID card is replaced by another or identification code is embedded into the image of the face photograph, the card thus forged can be easily identified as being forged.

Still further, On the recording medium of the present invention is stored the program for enabling the checking system of the card type recording medium to operate in the same process by a microcomputer or the like. Therefore, not only the specification of personal information such as fingerprints, faces, etc., but also management of copyrighted works, etc. can be performed with simple facilities.

What is claimed is:

1. A card recording medium comprising:
    a data area where data containing ID information of a holder are recorded; and
    an image area where image data are recorded;
    wherein contents in the image area are recorded second image data which are generated by transforming first image data specifying the holder to frequency-area data, adding the transformed frequency-area data with the ID information and inversely transforming the added data to image signals.

2. The card recording medium as claimed in claim 1, wherein the ID information of the data area is enciphered and recorded.

3. The card recording medium as claimed in claim 1, wherein the first image data is a fingerprint image of the holder.

4. The card recording medium as claimed in claim 1, wherein the first image data is a face photograph image of the holder.

5. The card recording medium as claimed in claim 2, wherein the first image data is a fingerprint image of the holder.

6. The card recording medium as claimed in claim 2, wherein the first image data is a face photograph image of the holder.

7. The card recording medium as claimed in claim 1, wherein the conversion processing to the frequency-area data is Fourier transform.

8. The card recording medium as claimed in claim 2, wherein the conversion processing to the frequency-area data is Fourier transform.

9. The card recording medium as claimed in claim 5, wherein the conversion processing to the frequency-area data is Fourier transform.

10. The card recording medium as claimed in claim 6, wherein the conversion processing to the frequency-area data is Fourier transform.

11. The card recording medium as claimed in claim 1, wherein the conversion processing to the frequency-area data is discrete cosine transform which is performed on each of blocks into which the first image data are divided.

12. The card recording medium as claimed in claim 2, wherein the conversion processing to the frequency-area data is discrete cosine transform which is performed on each of blocks into which the first image data are divided.

13. The card recording medium as claimed in claim 5, wherein the conversion processing to the frequency-area data is discrete cosine transform which is performed on each of blocks into which the first image data are divided.

14. The card recording medium as claimed in claim 6, wherein the conversion processing to the frequency-area data is discrete cosine transform which is performed on each of blocks into which the first image data are divided.

15. A method of certifying a card recording medium which contains a data area where data containing ID information of a holder are recorded, and an image area where image data are recorded, in the image area being recorded second image data which are generated by transforming first image data specifying the holder to frequency-area data, adding the transformed frequency-area data with the ID information and inversely transforming the added data to image signals, comprising:
    a first step for restoring the ID information from said card recording medium and reading data of the image area;
    a second step for transforming the image-area data to the frequency-area data to generate first transformed image data;
    a third step for gaining the same data as the first image data from a reading target other than said recording medium and transforming the image data thus gained to the frequency-area data to obtain second transformed image data; and
    a fourth step for subtracting the second transformed image data from the first transformed image data to obtain differential data, and comparing the differential data with the ID information restored from said card recording medium to judge whether said recording medium is justifiable.

16. The method as claimed in claim 15, wherein the conversion to the frequency-area data is Fourier transform.

17. The method as claimed in claim 15, wherein the conversion to the frequency-area data is discrete cosine transform which is performed on each of plural blocks into which the first image data are divided.

18. The method as claimed in claim 15, wherein said fourth step compares the differential data obtained every block with the ID information restored from said card recording medium to perform the judgment on the basis of majority voting of the comparison result.

19. The method as claimed in claim 16, wherein said fourth step compares the differential data obtained every block with the ID information restored from said card recording medium to perform the judgment on the basis of majority voting of the comparison result.

20. The method as claimed in claim 17, wherein said fourth step compares the differential data obtained every block with the ID information restored from said card recording medium to perform the judgment on the basis of majority voting of the comparison result.

21. A card recording medium enciphering system including enciphering means for enciphering ID information to be recorded on a magnetic card, and magnetic information forming means for recording the enciphered ID information as magnetic information on said magnetic card, comprising:
    frequency domain transformation means for transforming an original image pattern of a pattern of said magnetic card;
    adding means for transforming ID information to be recorded on said magnetic card to transformation information in which the ID information is distributed on a frequency domain, and adding the transformation information with the information which is generated by the transformation of said frequency domain transformation means;
    frequency domain inverse transformation means for restoring the information of the frequency domain generated by the addition of said adding means to a two-dimensional image pattern; and
    image pattern print means for printing the image pattern generated by said frequency domain inverse transformation means on said magnetic card so that the image pattern is used as the pattern of said magnetic card.

22. The card recording medium enciphering system as claimed in claim 21, further adding means for generating an ID information frequency spectrum so that the ID information frequency spectrum is similar to the distribution state of the original image frequency spectrum which is the information of the frequency domain generated by the transformation of said frequency domain transformation means, and adding the original image frequency spectrum and the ID information frequency spectrum.

23. The card recording medium enciphering system as claimed in claim 21, wherein said frequency domain transformation means performs FFT, and said frequency domain inverse transformation means performs inverse FFT.

24. The card recording medium enciphering system as claimed in claim 22, wherein said frequency domain transformation means performs FFT, and said frequency domain inverse transformation means performs inverse FFT.

25. The card recording medium enciphering system as claimed in claim 21, wherein said frequency domain transformation means performs DCT, and said frequency domain inverse transformation means performs inverse DCT.

26. The card recording medium enciphering system as claimed in claim 22, wherein said frequency domain transformation means performs DCT, and said frequency domain inverse transformation means performs inverse DCT.

27. A card recording medium decoder for a recording medium on which enciphered ID information and an image pattern containing ID information are printed, comprising:
   a magnetic reader for reading the enciphered ID information from a magnetic stripe of said recording medium;
   frequency domain transformation means for transforming the pattern of said magnetic card to frequency domain information by a magnetic head;
   deciphering means for deciphering the enciphered ID information and outputting ID information;
   image reading means for reading the image pattern;
   frequency domain transformation means for transforming the image pattern to frequency domain;
   a subtracter for subtracting from the frequency domain data frequency domain information to which the ID information is transformed; and
   frequency domain inverse transformation means for restoring the frequency domain information generated by the subtraction of said subtracter to a two-dimensional image pattern.

28. A card recording medium in which specific data for specifying a holder are written, comprising:
   identification data generated on the basis of the specific data which are embedded into spatial frequency data of a photograph; and
   the spatial frequency data embedded with the identification data which are inversely transformed to time data to generate image data and further record the image data thus generated.

29. The card recording medium as claimed in claim 28, wherein the spatial frequency data is a photograph image which is subjected to discrete cosine transform, and the inverse transformation is inverse discrete cosine transform.

30. The card recording medium as claimed in claim 28, wherein the spatial frequency data embedded with the identification data are generated by multiplying each component of the spatial frequency data of the photograph data and the component corresponding to the identification data, then multiplying the multiplication result and a constant value, and then adding the constant-multiplied value to the component corresponding to the spatial frequency data of the identification data.

31. The card recording medium as claimed in claim 29, wherein the spatial frequency data embedded with the identification data are generated by multiplying each component of the spatial frequency data of the photograph data and the component corresponding to the identification data, then multiplying the multiplication result and a constant value, and then adding the constant-multiplied value to the component corresponding to the spatial frequency data of the identification data.

32. The card recording medium as claimed in claim 28, wherein the specific data are written in a magnetic recording medium.

33. The card recording medium as claimed in claim 29, wherein the specific data are written in a magnetic recording medium.

34. The card recording medium as claimed in claim 30, wherein the specific data are written in a magnetic recording medium.

35. The card recording medium as claimed in claim 28, wherein said card recording medium is used as an ID card or a credit card.

36. The card recording medium as claimed in claim 29, wherein said card recording medium is used as an ID card or a credit card.

37. The card recording medium as claimed in claim 30, wherein said card recording medium is used as an ID card or a credit card.

38. A card recording medium forming system comprising:
   means for generating identification data on the basis of specific data for specifying a holder;
   means for transforming a photograph to be attached onto said card to spatial frequency data;
   means for multiplying each component of the spatial frequency data and the component corresponding to the identification data, and adding a value obtained by multiplying the multiplication value and a constant to the component corresponding to the spatial frequency data of the photograph data, and then inversely transforming the added spatial frequency data to image data; and
   means for writing the image data and the specific data on said card type recording medium.

39. The card recording medium as claimed in claim 38, wherein the transformation is discrete cosine transform, and the inverse transform is inverse discrete cosine transform.

40. A card recording medium certifying device for certifying a card recording medium in which identification data generated on the basis of the specific data are embedded into spatial frequency data of a photograph, then the spatial frequency data embedded with the identification data are inversely transformed to time data to generate image data, and then the image data are recorded together with the specific data, comprising:
   means for generating the identification data on the basis of the specific data;
   transformation means for transforming the image data to the spatial frequency data; and
   means for performing a correlation calculation between the output of said transformation means and the identification data and judging on the basis of the correlation calculation result whether the card recording medium is true or not.

41. A recording medium for storing a program for operating a card recording medium forming system in a computer, wherein said program contains:
   a step of generating identification data on the basis of specific data specifying a holder;
   a step of transforming a photograph to be attached to spatial frequency data;

a step of multiplying each component of the spatial frequency data and the component corresponding to the identification data, and adding a value obtained by multiplying the multiplication value and a constant to the component corresponding to the spatial frequency data of the photograph image, and inversely transforming the added spatial frequency data to image data; and a step of writing the image data and the specific data on the card recording medium.

42. The recording medium as claimed in claim 41, wherein the transformation is discrete cosine transform, and the inverse transformation is inverse discrete cosine transform.

43. A recording medium for storing a program for operating in a computer a checking system for a card recording medium in which identification data generated on the basis of the specific data are embedded into spatial frequency data of a photograph, then the spatial frequency data embedded with the identification data are inversely transformed to time data to generate image data, and then the image data are recorded together with the specific data, comprising:

a step of generating the identification data on the basis of the specific data;

a step of transforming the image data to the spatial frequency data; and a step of performing a correlation calculation between the output of said transformation means and the identification data and judging on the basis of the correlation calculation result whether the card recording medium is true or not.

44. A card recording medium comprising:

a data area where data containing ID information inherent to a holder are recorded; and an image area where image data are recorded, wherein said image area are recorded second image data which are generated by transforming first image data specifying the holder to frequency-area data, adding the transformed frequency-area data with data obtained by transforming the ID information to frequency-area information, and inversely transforming the added data to image signals.

45. The card recording medium as claimed in claim 44, wherein the ID information of the data area are recorded while enciphered.

46. The card recording medium as claimed in claim 44, wherein the first image data is a fingerprint image of the holder.

47. The card recording medium as claimed in claim 44, wherein the first image data is a face photograph image of the holder.

48. The card recording medium as claimed in claim 45, wherein the first image data is a fingerprint image of the holder.

49. The card recording medium as claimed in claim 45, wherein the first image data is a face photograph image of the holder.

50. An apparatus for certifying a card recording medium which contains a data area where data containing ID information of a holder are recorded, and an image area where image data are recorded, in the image area being recorded second image data which are generated by transforming first image data specifying the holder to frequency-area data, adding the transformed frequency-area data with the ID information and inversely transforming the added data to image signals, comprising:

an ID information reader for restoring the ID information from said card recording medium;

an image reader of reading the image-area data;

a conversion unit for transforming the image-area data to the frequency-area data to generate first transformed image data;

a second image reader for reading the same image data as the first image data from a reading target other than said recording medium;

a second conversion unit for transforming the image data thus obtained to the frequency-area data to obtain second transformed image data;

a subtracter for subtracting the second transformed image date from the first transformed image data to obtain differential data; and a judgment circuit for comparing the differential data with the ID information restored from said card recording medium to judge whether said card recording medium is justifiable.

* * * * *